US010482564B2

(12) United States Patent
Zhou et al.

(10) Patent No.: US 10,482,564 B2
(45) Date of Patent: Nov. 19, 2019

(54) METHOD AND SYSTEM FOR IMPROVING GPU PERFORMANCE DURING DATA-INTENSIVE VISUALIZATION OPERATIONS

(71) Applicant: Alibaba Group Holding Limited, Grand Cayman (KY)

(72) Inventors: Ningyi Zhou, Hangzhou (CN); Xiao Wen, Hangzhou (CN); Ruixian Ma, Hangzhou (CN); Ye Zhang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 98 days.

(21) Appl. No.: 15/690,593

(22) Filed: Aug. 30, 2017

(65) Prior Publication Data

US 2018/0075571 A1 Mar. 15, 2018

(30) Foreign Application Priority Data

Sep. 12, 2016 (CN) .......................... 2016 1 0818816

(51) Int. Cl.
*G06T 15/00* (2011.01)
*G06T 1/20* (2006.01)
*G01C 21/36* (2006.01)
*G06T 11/00* (2006.01)
*G06T 11/20* (2006.01)

(52) U.S. Cl.
CPC ............ *G06T 1/20* (2013.01); *G01C 21/3676* (2013.01); *G06T 11/001* (2013.01); *G06T 11/203* (2013.01); *G06T 11/206* (2013.01); *G06T 15/005* (2013.01)

(58) Field of Classification Search
None
See application file for complete search history.

(56) References Cited

U.S. PATENT DOCUMENTS

| 7,986,358 | B1 | 7/2011 | Blais-Morin et al. |
| 8,026,912 | B1 | 9/2011 | Danskin |
| 8,044,955 | B1 | 10/2011 | Yhann |
| 8,169,434 | B2 | 5/2012 | Zhou et al. |
| 8,212,826 | B1 | 7/2012 | Williams et al. |

(Continued)

FOREIGN PATENT DOCUMENTS

WO  200139124 A2  5/2001

OTHER PUBLICATIONS

International Search Report and Written Opinion to corresponding International Application No. PCT/US2017/049581 dated Nov. 16, 2017 (16 pages).

*Primary Examiner* — Joni Richer
(74) *Attorney, Agent, or Firm* — James J. DeCarlo; Greenberg Traurig, LLP

(57) ABSTRACT

Disclosed herein are methods and systems for improving GPU processing during visualization operations. In one embodiment, the method comprises receiving a data frame at a central processing unit (CPU), the data frame including a plurality of pieces of associated data; identifying, by the CPU, feature information corresponding to the plurality of pieces of associated data; generating, by the CPU, overall feature information by combining at least a portion of the feature information; and sending, by the CPU, the overall feature information to a graphics processing unit (GPU).

19 Claims, 12 Drawing Sheets

(56) References Cited

U.S. PATENT DOCUMENTS

| | | |
|---|---|---|
| 8,290,882 B2 | 10/2012 | Sharp |
| 8,698,837 B2 | 5/2014 | Kilgard |
| 8,810,590 B2 | 8/2014 | Oat et al. |
| 9,043,515 B1 | 5/2015 | Tavares |
| 9,064,333 B2 | 6/2015 | Crow et al. |
| 9,275,498 B2 | 3/2016 | Ceylan et al. |
| 9,304,730 B2 | 4/2016 | Bittner et al. |
| 9,311,738 B2 | 4/2016 | Kilgard |
| 2003/0231806 A1 | 12/2003 | Troyanker |
| 2004/0030832 A1 | 2/2004 | Squibbs |
| 2007/0159488 A1 | 7/2007 | Danskin et al. |
| 2010/0013854 A1 | 1/2010 | Michail |
| 2010/0049502 A1 | 2/2010 | Oppenheim et al. |
| 2011/0238295 A1* | 9/2011 | Yaguchi ............... G01C 21/367 701/533 |
| 2012/0001905 A1 | 1/2012 | Andonieh et al. |
| 2012/0050303 A1* | 3/2012 | McAllister ............... G09G 5/02 345/589 |
| 2012/0069036 A1* | 3/2012 | Dharmapurikar ......... G06F 3/14 345/582 |
| 2012/0262463 A1 | 10/2012 | Bakalash et al. |
| 2013/0185646 A1 | 7/2013 | Wiggins et al. |
| 2015/0020008 A1* | 1/2015 | Pensack-Rinehart ....................... G06F 3/04847 715/765 |
| 2015/0178404 A1* | 6/2015 | Merugu ............. G06F 16/9577 707/689 |
| 2015/0371410 A1 | 12/2015 | Hwang et al. |
| 2016/0292813 A1 | 10/2016 | Bittner et al. |
| 2017/0178277 A1 | 6/2017 | Sharma et al. |

\* cited by examiner

METHOD AND SYSTEM FOR IMPROVING GPU PERFORMANCE DURING DATA-INTENSIVE VISUALIZATION OPERATIONS

CROSS-REFERENCE TO RELATED APPLICATIONS

This application claims the benefit of priority of Chinese Application No. 201610818816.4, titled "Method and System for Processing Data," filed on Sep. 12, 2016, which is hereby incorporated by reference in its entirety.

BACKGROUND

Technical Field

The present disclosure relates to the field of computer architecture, and in particular, to method and systems for improving GPU processing during visualization operations.

Description of the Related Art

With advances in science and technology, associated data exists in many fields such as e-commerce, telecommunications, traffic and the like. Associated data refers to data having an associative relationship between a start point and an end point.

For example, a ship-from address and a ship-to address are one piece of associated data in the field of e-commerce; a calling party address and a called party address are one piece of associated data in the field of telecommunications; and a departure address and a destination address are also one piece of associated data in the field of transportation.

In order to make the associated data more intuitive, the associated data may be visualized on a map. Currently, "flight line" or "trajectory" visualizations are commonly adopted to display associated data and depict a visualization result. Other methods may also be used to visualize the associated data and to obtain a visualization result, and are not listed in detail herein.

In order to enable those skilled in the art to more clearly understand the result of visualizing the associated data, illustrations and descriptions are provided below. With reference to FIG. 1A, the "flight line" method is used to display a visualization result. As can be seen from FIG. 1A, two end points are used to represent, for example, a ship-from address and a ship-to address and a curve is used to represent an association relationship between the described addresses.

With reference to FIG. 1B, the "trajectory" method is used to display the visualization result of visualizing the associated data. As can be seen from FIG. 1B, two end points are used to represent a ship-from address and a ship-to address and a trajectory is used to represent an association relationship between the described addresses.

In order to display the directionality from a start point to an end point of the associated data, different colors may be added at different positions of a line segment; and the direction from the start point to the end point is indicated through a variation in color shades of the line segment. For example, a shooting-star effect is set for a line segment color; the parts closest to the start point have the darkest color whereas the parts closest to the end point have the lightest color (not illustrated).

Currently, associated data is visualized using an image processing device, including a central processing unit (CPU) and a graphics processing unit (GPU). When the CPU receives multiple pieces of associated data, data transfers need to be performed multiple times between the CPU and the GPU. That is, the number of times of communication between the CPU and the GPU is consistent with the number of pieces of associated data.

However, due to hardware limitations of an image processing device, if the number of times of communication between the CPU and the GPU is relatively large, the frame rate of the GPU would be reduced, thereby affecting the display performance of the GPU.

BRIEF SUMMARY

In view of this, the disclosed embodiments provide methods and systems for processing data wherein the number of instances of communication between the CPU and the GPU is reduced during visualization of associated data.

In one embodiment, a method is disclose that comprises receiving a data frame at a central processing unit (CPU), the data frame including a plurality of pieces of associated data; identifying, by the CPU, feature information corresponding to the plurality of pieces of associated data; generating, by the CPU, overall feature information by combining at least a portion of the feature information; and sending, by the CPU, the overall feature information to a graphics processing unit (GPU).

In another embodiment, a system is disclosed comprising a graphics processing unit (GPU) and a central processing unit (CPU) configured to receive a data frame, the data frame including a plurality of pieces of associated data; identify feature information corresponding to the plurality of pieces of associated data; generate overall feature information by combining at least a portion of the feature information; and send the overall feature information to the GPU.

The following advantageous effects may be achieved through the above-mentioned embodiments.

The disclosed embodiments provide methods for processing data, of which multiple pieces of feature information are combined to obtain overall feature information, thereby transmitting the overall feature information between the CPU and the GPU.

In current systems, the CPU has to repeatedly communicate with the GPU to transfer multiple pieces of feature information. In the disclosed embodiments, however, the CPU only needs to have one communication transmission with the GPU because multiple pieces of feature information are combined into one overall piece of feature information.

Thus, the communication frequencies between the CPU and the GPU can be greatly reduced in the present application, thereby improving the frame rate of the GPU and reducing the impact on display performance of the GPU.

BRIEF DESCRIPTION OF THE DRAWINGS

In order to more clearly illustrate the technical solutions in embodiments of the present disclosure or current systems, the drawings which need to be used in the description of the embodiments or the current systems will be introduced briefly below. The drawings described below are merely some embodiments of the disclosure, and those of ordinary skill in the art also can obtain other drawings according to these drawings without creative efforts.

DETAILED DESCRIPTION

The embodiments disclosed herein will be described clearly and completely below with reference to the drawings. The described embodiments are merely some, rather than all of the embodiments of the present disclosure. Based on the disclosed embodiments, all other embodiments obtained by those of ordinary skill in the art without making creative efforts shall fall within the scope of the disclosure.

In order to enable those skilled in the art to clearly understand the disclosed embodiments, a system for processing data that is used to visualize associated data is first introduced.

Figure 2:
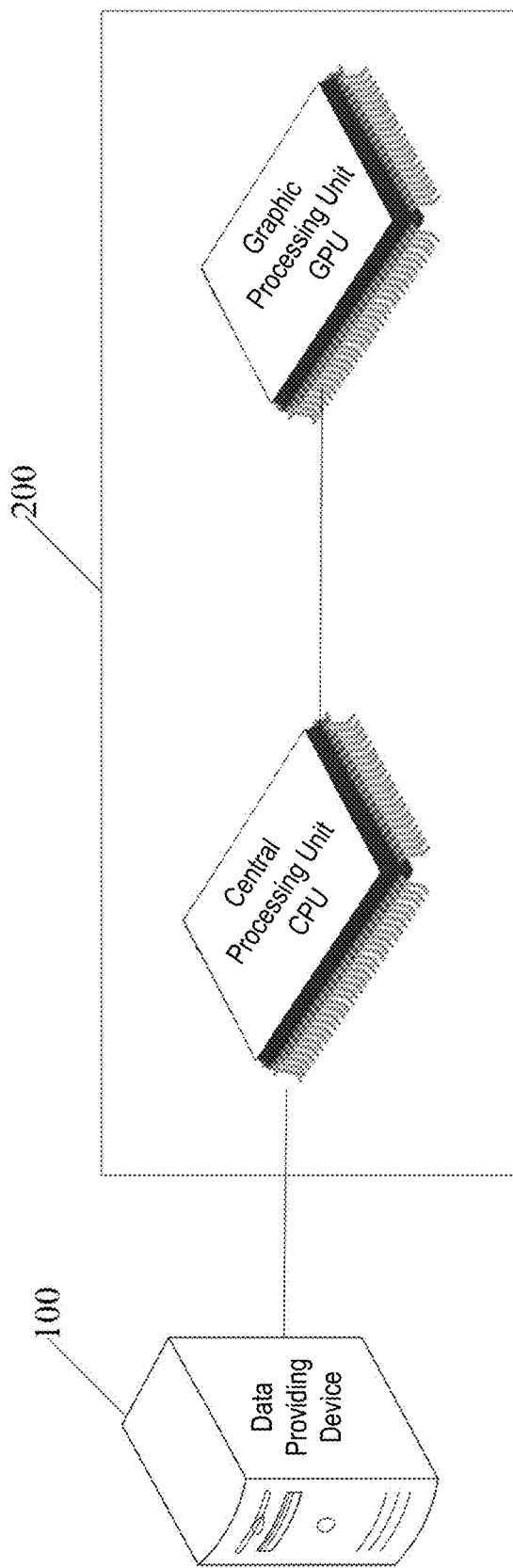
FIG. 2 is a diagram of a system for processing data according to some embodiments of the disclosure.

FIG. 2 is a diagram of a system for processing data according to some embodiments of the disclosure.

The system for processing data comprises a data providing device 100 and a data processing device 200. The data processing device 200 comprises a central processing unit (CPU) and a graphics processing unit (GPU). As illustrated, the CPU is communicably connected to the GPU. The data providing device 100 sends associated data to the data processing device 200.

The disclosed embodiments may be applied to a plurality of application scenarios and the data providing device and the associated data may differ depending on the different application scenarios. Illustrations are provided below by using examples of application scenarios.

For example, the disclosed embodiments may be applied in the field of e-commerce and a ship-from address and a ship-to address of an order may be visualized. In this situation, the data providing device 100 may be an order server of an e-commerce system and the associated data is the ship-from address and the ship-to address associated with an order. In one embodiment, the order server includes a plurality of groups of ship-from and ship-to addresses. Thus, the order server may send the plurality of groups of ship-from and ship-to addresses to the data processing device 200.

As another example, the disclosed embodiments may be applied in the field of telecommunications, and a calling party address and a called party address of a telephone call may be visualized. In this example, the data providing device 100 may be a traffic server of a telecommunications system and the associated data is the calling party address and the called party address. In one embodiment, the traffic server includes a plurality of groups of calling party and called party addresses. Thus, the traffic server may send the plurality of groups of calling party and called party addresses to the data processing device 200.

As another example, in the field of telecommunications, a sender address and a receiver address of a short message may also be visualized. In this example, the data providing device 100 may be a short-message server of a telecommunications system. For example, the disclosed embodiments may also be applied in the field of instant messaging software. A plurality of instant messaging messages exist in the instant messaging software (such as DINGTALK and ALITALK and the like). Sender addresses and receiver addresses of the instant messaging software may be visualized. In this situation, the data providing device 100 may be a server of the instant messaging software.

The disclosed embodiments may also, for example, visualize a sender and a receiver of a mail. In this situation, the data providing device 100 may be an email server.

As another example, the disclosed embodiments may be applied in the field of transportation in which a departure address and a destination address of a vehicle (a car, train, bus, airplane, military combat vehicle, ship, bicycle, etc.) may be visualized. In this situation, the data providing device 100 may be a navigation server of a transportation system and the associated data is the departure address and the destination address. In one embodiment, the navigation server includes a plurality of groups of departure addresses and end addresses. Thus, the navigation server may send the plurality of groups of departure and end addresses to the data processing device 200.

The disclosed embodiments may be applied, for example, in the field of games and a start point and a destination point of weapons such as gunfire, an arrow and the like in a game may be visualized. In this example, the data providing device 100 may be a game server of a game system and the associated data is the start point and the destination point. In one embodiment, the game server includes a plurality of groups of start addresses and end addresses. Thus, the game server may send the plurality of groups of start points and end points to the data processing device 200.

The disclosed embodiments may be applied, for example, to the technical field of group movement in a public place. In this example, the disclosed embodiments may visualize a start point and a destination point of a crowd movement in a public place (e.g., a marketplace, scenic region, bus station, train station, etc.). The disclosed embodiments may visualize a departure address and a destination address of moving objects and the like. In this situation, the data providing device 100 may be a data server for recognizing a start point and a destination point of a crowd and the associated data is the start point and the destination point. It can be understood that the data server includes a plurality of groups of departure addresses and end addresses. Thus, the data server may send the plurality of groups of start and end points to the data processing device 200.

As another example, the disclosed embodiments may also be applied in the field of military combat technologies to visualize a start point and a destination point of weapon firing. In this example, the data providing device 100 may be a server for recognizing a start point and a destination point of weapon firing and the associated data is the start point and the destination point.

As another example, the disclosed embodiments may be applied in the field of weather to visualize a starting point and an ending point of an airflow, a typhoon or a wind direction. In this example, the data providing device 100 may be a server for recognizing a start point and a destination point in a weather condition.

The disclosed embodiments may be applied, for another example, to a starting point and an ending point of planet movements in the field of astronomy. In this example, the data providing device 100 may be a server for recognizing a start point and a destination point in a planet movement condition.

It can be understood that the disclosed embodiments are not limited to the illustrated scenarios provided in the above examples. The technology provided in the disclosed embodiments can be applied in situations where the visualized object has a start point and a destination point in its movement.

The data processing device 200 is used for receiving and processing associated data to achieve the goal of visualizing the associated data on a map as described in more detail herein.

The process of visualizing associated data by the data processing device 200 in current systems is introduced below in connection with FIG. 3, such that those skilled in the art could have a better understanding of the technical problems existing in current systems.

In current systems, the process of processing each piece of associated data by the data processing device 200 is consistent, except that the process of identifying display line data is different in different application scenarios. The operation of current systems is illustrated below by using a group of a ship-to address and a ship-from address in the field of e-commerce as the associated data as an example.

Figure 3:
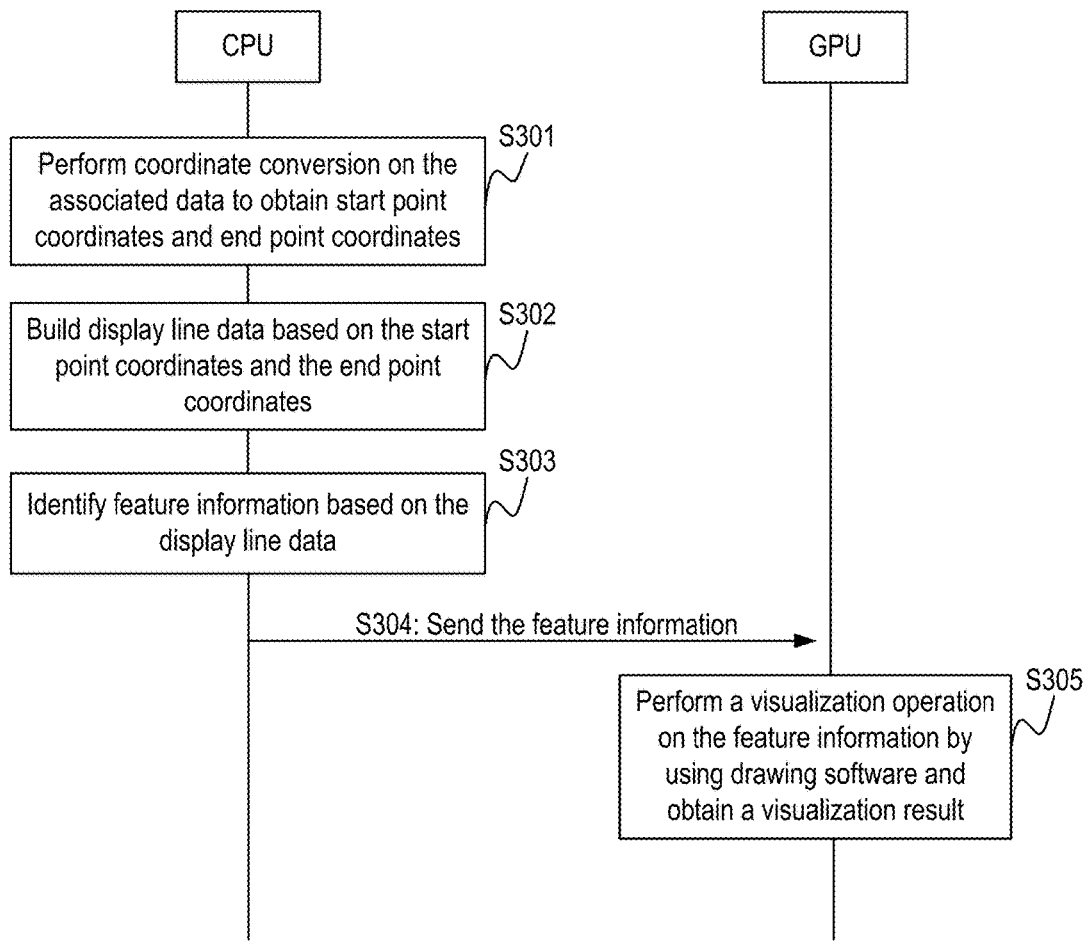
FIG. 3 is a flow diagram illustrating a method for processing data used in current systems.

FIG. 3 is a flow diagram illustrating a method for processing data used in current systems.

Step S301: A CPU receives associated data sent by a data providing device and then performs coordinate conversion on the associated data to obtain start point coordinates and end point coordinates.

Assuming that a ship-from address is "Hangzhou" and a ship-to address is "Shanghai," after performing three-dimensional coordinates conversion on the associated data, the start point coordinates, $x_1, y_1, z_1$, (i.e., the coordinates of the ship-from address "Hangzhou") in the associated addresses may be obtained; and the end point coordinates, $x_2, y_2, z_2$, (i.e., the coordinates of the ship-to address "Shanghai"), in the associated addresses may be obtained. Herein, $x_1, y_1, z_1, x_2, y_2$ and $z_2$ are specific coordinate values.

Step S302: the CPU builds display line data based on the start point coordinates and the end point coordinates.

A person skilled in the art may pre-determine the type of the display line, which may include "flight line" and "trajectory." The flight line may be a straight line, a parabola or a broken line and the like, while the "trajectory" is a trajectory line of a movement of an object from a start point to an end point.

A processor may select a preset function corresponding to the display line type. Then, the preset function is stored in the CPU. In this step, the CPU may invoke the preset function and carry out computation according to the start point coordinates and the end point coordinates to obtain the display line data.

For example, in the case where the display line type is a parabola, the CPU pre-stores a preset function corresponding to the parabola type, such as $y=ax^2+bx+c$. First, intermediate coordinates $$\left(\frac{x_1+x_2}{2}, \frac{y_1+y_2}{2}, \frac{z_1+z_2}{2}\right)$$

between the start point coordinates and the end point coordinates are calculated.

The start point coordinates $(x_1, y_1, z_1)$, the end point coordinates $(x_2, y_2, z_2)$ and the intermediate coordinates $$\left(\frac{x_1+x_2}{2}, \frac{y_1+y_2}{2}, \frac{z_1+z_2}{2}\right)$$

are substituted into $y=ax^2+bx+c$ to calculate specific values of a, b and c, thereby determining the display line data corresponding to the associated data.

Assuming that a=5, b=4, and c=3, the display line data is $y=5x^2+4x+3$. The specific values of a, b and c are merely exemplified, and do not represent a real situation.

The above-mentioned parabolic equation is a relatively simple example. In an actual application, a normal vector, i.e., direction of gravity, may be set for the flight line, so as to indicate that all parabolic movements to the ground are influenced by gravity. The normal vector is represented by normal. If the trajectory of a parabolic movement to the ground is spherical, assuming that the coordinates of a sphere center is (0, 0, 0), a normalized vector of normal is $$\left(\frac{x_1+x_2}{2}, \frac{y_1+y_2}{2}, \frac{z_1+z_2}{2}\right).$$

A parabola that opens downward $(1-\lambda)*\lambda*kHeight$ is preset. Herein, $\lambda$ represents a definite-proportion division point, and kHeight represents a height proportionality coefficient. Then, $(1-\lambda)*\lambda*kHeight*normal$ is added to the definite-proportion division point of the start point coordinates $(x_1, y_1, z_1)$ and the end point coordinates $(x_2, y_2, z_2)$ to form a 3D parabola, i.e., the display line data.

The above section merely provides two specific implementations of determining the display line data. It should be understood that the preset function may vary with the display line and the specific preset function may be determined according to actual situations, and is not limited herein.

Step S303: the CPU identifies feature information based on the display line data.

The feature information specifically comprises a position array and a color array. Specifically, a plurality of position points may be identified from the display line data, each position point corresponding to a position coordinate and a color value. Position coordinates of the plurality of position points form a position array of the feature information; and color values of the plurality of position points form a color array of the feature information.

The process of identifying the feature information is introduced in detail below. The CPU identifies a position array in the display line data by using a position function; identifies a color value of each position point in the position array by using a color function; and combines the color values of respective position points to form a color array. The number of the position points in the position array is definite, such as m. Then, the object of the position function is to take coordinate values of m position points from the display line data. Preferably, the position function may equidistantly take the coordinate values of m position points from the display line data; and of course, the position function may also be used to randomly take the coordinate values of m position points from the display line data.

After identifying the position array, the color function is used to set different colors for m position points, so as to use different colors to represent the directionality from a start point to an end point. That is, the color array also comprises m color values, each color value corresponding to a position point in the position array.

Step S304: the CPU sends the feature information to a GPU.

Step S305: the GPU performs a visualization operation on the feature information by using drawing software and obtains a visualization result. The GPU identifies coordinates of respective position points in the position array in a preset map and sets corresponding colors in the color array for respective position points. Then, by means of a canvas-based drawing standard or the SVG drawing standard, a display line is displayed based on respective position points (the specific implementation process is not critical to the disclosed embodiments and is thus not repeatedly described herein), and different portions of the display line have different colors.

In the above-mentioned embodiment, each piece of associated data only corresponds to one piece of feature information; and it can be understood that the way of expressing the associated data is relatively simple with only the feature information (the position array and the color array). In order to vividly display the associated data, geometric information corresponding to the associated data may be added, wherein the geometric information includes information such as a shape array, a curvature feature value, and a width feature value and the like.

The shape array is used to represent the shape of an object to be displayed. For example, in the case where the associated data is a departure address and a destination address of an order, in order to vividly display the order on a map, a shape representing the "order" may be displayed on the display line; for example, a cube representing a parcel. At this time, the shape array is an array representing the shape of the cube.

As another example, in the case where the associated data is a weapon in a game, in order to vividly display the shape of the weapon, the shape array may be used for representation. For example, when the weapon is a "dart", in the process of displaying a movement of the "dart" from a start point to a destination point, a position point representing the shape of the "dart" may be added in the shape array in order to display the shape of the "dart" on the display line.

The curvature feature value is used to represent the arc radius of the display line. The arc radius may vary depending on specific application scenarios, and may be preset by a person skilled in the art and may also be processed by a processor according to different conditions during use.

For example, taking the departure address and the destination address of the order as an example. Because the arc radius between the departure address and the destination address may be preset. The arc radius between departure addresses and destination addresses of respective orders may then be consistent, thereby maintaining consistency. In different technical fields, in order to enable the display line to be more applicable for specific application scenarios, a person skilled in the art could modify the magnitude of the curvature feature value of the display line.

The width feature value is used to represent the width of the display line. Similar to the above-mentioned curvature feature value, the feature is an adjustable feature, provided to be applicable for different technical fields and is adjustable by a person skilled in the art.

Generally speaking, the geometric information is pre-stored in a storage space of the CPU and thus the CPU may directly extract the geometric information corresponding to the associated data from the storage space. For ease of description, the feature information and the geometric information are referred to as attribute information. In the attribute information, the feature information certainly is indispensable content while the geometric information is optional content. During a specific implementation, the attribute information may be determined according to actual situations.

The above process shown in FIG. 3 is a process of processing a piece of associated data by a data processing device; in the case where the CPU receives multiple pieces of associated data, each piece of associated data is processed according to the process shown in FIG. 3.

It can be understood that when the CPU receives a piece of associated data, data communication needs to be performed once between the CPU and the GPU (transmission of a piece of feature information); and when the CPU receives multiple pieces of associated data, data communication needs to be performed multiple times between the CPU and the GPU (transmission of multiple pieces of feature information).

However, due to hardware limitations of a data processing device, if the number of times of communication between the CPU and the GPU is relatively large, the frame rate of the GPU would be reduced, thereby affecting the display performance of the GPU. Therefore, the disclosed embodiments provide methods to solve the problem faced by the data processing device without changing the hardware structure of the data processing device.

The disclosed embodiments to remedy these deficiencies are introduced below.

In current systems, the reason that the CPU communicates with the GPU many times per data frame is that each piece of feature information obtained in the data frame is communicated once between the CPU and the GPU. Thus when the number of pieces of feature information calculated in the data frame is relatively large, the number of times of communication between the CPU and the GPU is correspondingly high.

In order to reduce the number of times of communication between the CPU and the GPU, the disclosed embodiments provides the following solution: the CPU combines multiple pieces of feature information to obtain overall feature information, and then sends the overall feature information to the GPU.

For example, for i pieces of feature information, the CPU has to communicate with the GPU for i times in current systems. In the disclosed embodiments, the i pieces of feature information may be combined into one piece of overall feature information and thus, the CPU only has to communicate with the GPU once. Therefore, the number of times of communication between the CPU and the GPU may be greatly reduced.

Regarding the technical features of the CPU combining multiple pieces of feature information to obtain the overall feature information and then sending the overall feature information to the GPU, the disclosed embodiments provide four parallel implementations which are introduced below.

In a first implementation, the CPU communicates with the GPU once in a data frame.

Figure 4A:
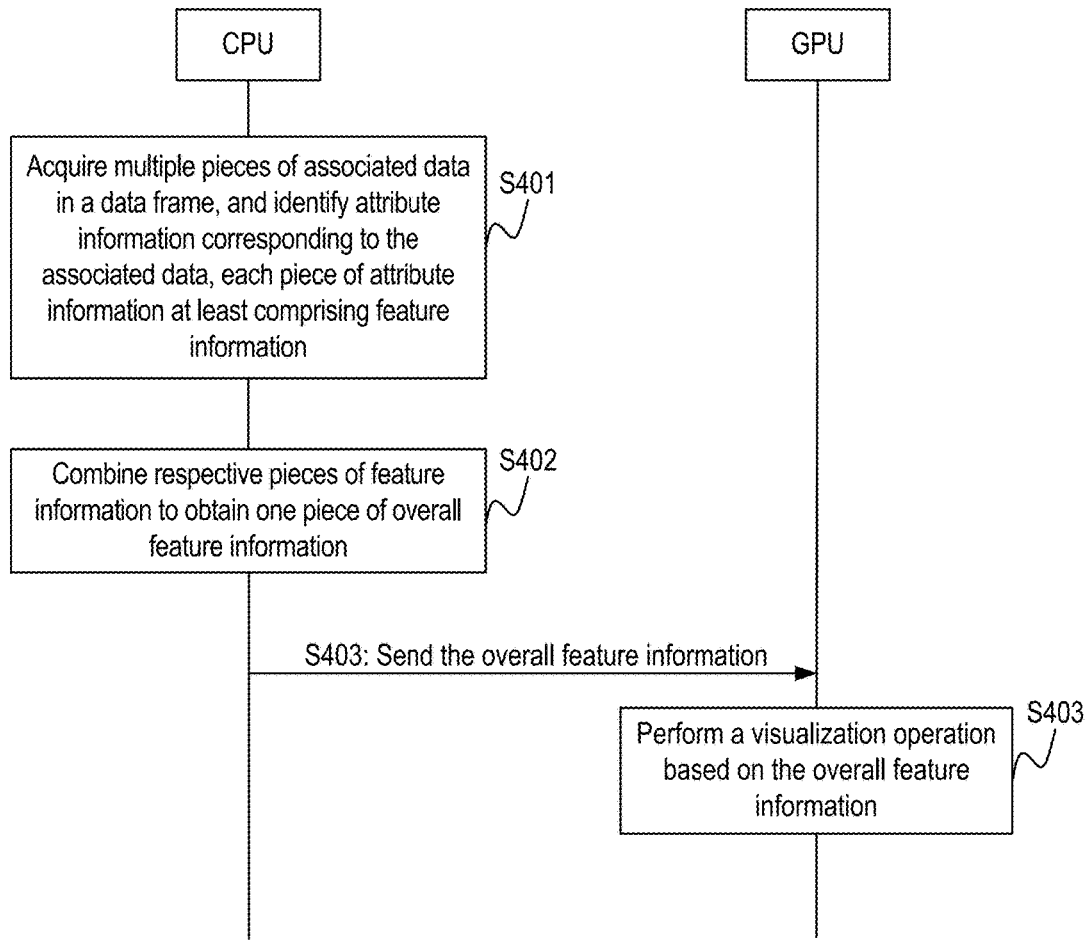
FIGS. 4A-4B are flow diagrams illustrating methods for processing data according to some embodiments of the disclosure.

FIG. 4A is a flow diagram illustrating a method for processing data according to some embodiments of the disclosure.

Step S401: the CPU acquires multiple pieces of associated data in a data frame, and identifies attribute information corresponding to the associated data, each piece of attribute information at least comprising feature information.

If the attribute information includes geometric information, the respective pieces of geometric information corresponding to the respective pieces of associated data are acquired in a storage space of the CPU.

The process of identifying the feature information corresponding to the associated data is described in more detail herein.

In the case where the number of pieces of feature information in the CPU is not defined, the CPU acquires any number of pieces of associated data for a data frame and identifies the feature information corresponding to each piece of associated data.

The CPU performs steps S301-S302 in FIG. 3 for each piece of associated data and obtains n pieces of feature information: feature information 1, feature information 2, feature information 3, . . . feature information i, . . . feature information n.

The feature information includes a position array P and a color array C; and thus feature information 1 includes a position array $P_1$ and a color array $C_1$; feature information 2 includes a position array $P_2$ and a color array $C_2$; feature information 3 includes a position array $P_3$ and a color array $C_3$; . . . feature information i includes a position array $P_i$ and a color array $C_i$; . . . feature information n includes a position array $P_n$ and a color array $C_n$.

Assuming that the number of position points in the position array is m and the number of color values in the color array is also m, then n pieces of feature information may be:

|  | position array | color array |
|---|---|---|
| feature information 1 | $P_1[p_{11}\ p_{12}\ p_{13}\ \cdots\ p_{1j}\ \cdots\ p_{1m}]$ | $C_1[c_{11}\ c_{12}\ c_{13}\ \cdots\ c_{1j}\ \cdots\ c_{1m}]$ |
| feature information 2 | $P_2[p_{21}\ p_{22}\ p_{23}\ \cdots\ p_{2j}\ \cdots\ p_{2m}]$ | $C_2[c_{21}\ c_{22}\ c_{23}\ \cdots\ c_{2j}\ \cdots\ c_{2m}]$ |
| feature information 3 | $P_3[p_{31}\ p_{32}\ p_{33}\ \cdots\ p_{3j}\ \cdots\ p_{3m}]$ | $C_3[c_{31}\ c_{32}\ c_{33}\ \cdots\ c_{3j}\ \cdots\ c_{3m}]$ |
| . . . | . . . | . . . |
| feature information i | $P_i[p_{i1}\ p_{i2}\ p_{i3}\ \cdots\ p_{ij}\ \cdots\ p_{im}]$ | $C_i[c_{i1}\ c_{i2}\ c_{i3}\ \cdots\ c_{ij}\ \cdots\ c_{im}]$ |
| . . . |  |  |
| feature information n | $P_n[p_{n1}\ p_{n2}\ p_{n3}\ \cdots\ p_{nj}\ \cdots\ p_{nm}]$ | $C_n[c_{n1}\ c_{n2}\ c_{n3}\ \cdots\ c_{nj}\ \cdots\ c_{nm}]$ |

However, due to the display performance of the GPU, a display line corresponding to the feature information cannot be rendered without limitation. Therefore, the number of pieces of feature information that may be built may be set to a preset number in the CPU. In this embodiment, since the GPU may build a partial number of pieces of feature information, a remaining number is used to represent the number of pieces of feature information that may be additionally built by the CPU. The remaining number is equal to the preset number less the partial number.

Thus, the CPU may judge whether the number of the multiple pieces of associated data is larger than the remaining number after receiving multiple pieces of associated data in a data frame. If the number of the multiple pieces of associated data is not larger than the remaining number it indicates that the remaining number is large enough and the feature information may be built for each piece of associated data. Therefore, the CPU may identify the feature information corresponding to each piece of associated data in the multiple pieces of associated data.

If the number of the multiple pieces of associated data is larger than the remaining number, it indicates that the remaining number is not large enough; and the feature information cannot be built for each piece of associated data. As a result, several pieces of associated data are screened from the multiple pieces of associated data and the number of the several pieces of associated data is not larger than the remaining number. The CPU may identify the feature information corresponding to each piece of associated data in the several pieces of associated data.

In the case where the preset number is not set in the CPU, a detailed description of this step is given below.

In a data frame, the CPU acquires multiple pieces of associated data sent by a data providing device. In order to clearly illustrate the embodiment, it is assumed that n pieces of associated data are acquired in a data frame.

Herein, i represents an identifier of feature information and j represents an identifier of a position point; $p_{ji}$ represents a position coordinate of a position point and $c_{ij}$ represents a color value of a position point. Each color value may be specifically represented in the RGB color format or the CMYK color format, which is not limited herein.

Step S402: the CPU combines the respective pieces of feature information to obtain one piece of overall feature information.

Continuing with the above-mentioned example: the respective pieces of feature information are directly combined; that is, position arrays in the n pieces of feature information are combined to obtain an overall position array; and color arrays in the n pieces of feature information are combined to obtain an overall color array; one piece of overall feature information is then obtained.

The combined overall position array is: $[p_{11}\ p_{12}\ p_{13}\ \cdots\ p_{1j}\ \cdots\ p_{1m}\ p_{21}\ p_{22}\ p_{23}\ \cdots\ p_{2j}\ \cdots\ p_{2m}\ p_{31}\ p_{32}\ p_{33}\ \cdots\ p_{3j}\ \cdots\ p_{3m}\ \cdots\ p_{i1}\ p_{i2}\ p_{i3}\ \cdots\ p_{ij}\ \cdots\ p_{im}\ \cdots\ p_{n1}\ p_{n2}\ p_{n3}\ \cdots\ p_{nj}\ \cdots\ p_{nm}]$.

The combined overall color array is: $[c_{11}\ c_{12}\ c_{13}\ \cdots\ c_{1j}\ \cdots\ c_{1m}\ c_{21}\ c_{22}\ c_{23}\ \cdots\ c_{2j}\ \cdots\ c_{2m}\ c_{31}\ c_{32}\ c_{33}\ \cdots\ c_{3j}\ \cdots\ c_{3m}\ \cdots\ c_{i1}\ c_{i2}\ c_{i3}\ \cdots\ c_{ij}\ \cdots\ c_{im}\ \cdots\ c_{n1}\ c_{n2}\ c_{n3}\ \cdots\ c_{nj}\ \cdots\ c_{nm}]$.

Step S403: the CPU sends the overall feature information to the GPU.

Step S404: the GPU performs a visualization operation based on the overall feature information.

In the case where the attribute information only includes the feature information, the CPU only needs to send the overall feature information (the overall position array and the overall color array) to the GPU. The GPU receives the overall feature information sent from the central processing unit; performs a rendering operation based on the overall feature information and obtains rendering data; and performs a visualization operation by using the rendering data and obtains a visualization result corresponding to the overall feature information.

In the case where the attribute information includes feature information and geometric information, the CPU needs to send the overall feature information (the overall position array and the overall color array) and the respective pieces of geometric information to the GPU. The GPU receives the overall feature information and the respective pieces of geometric information sent from the central processing unit; performs a rendering operation based on the overall feature information and obtains rendering data; and performs a visualization operation by using the rendering data and obtains a visualization result.

For i pieces of feature information, the CPU needs to communicate with the GPU for i times in current systems. In the disclosed embodiments, the n pieces of feature information may be combined into one piece of overall feature information; and thus the CPU only needs to communicate with the GPU once. Therefore, the number of times of communication between the CPU and the GPU may be greatly reduced.

Figure 5A:
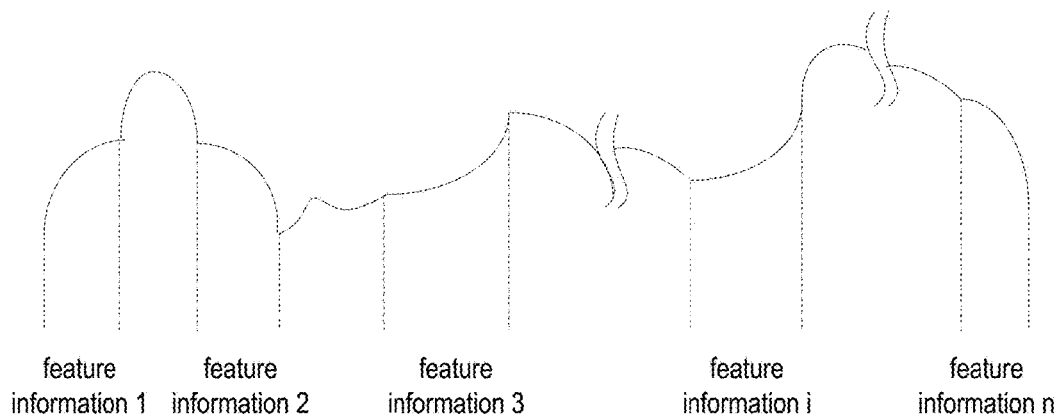
FIGS. 5A-5B are diagrams of visualization results according to some embodiments of the disclosure.

Since the GPU associates one piece of feature information to one display line, the visualization result obtained by the GPU after performing drawing according to the overall feature information in the disclosed embodiments is that: respective position points are drawn on one display line (please refer to FIG. 5A in which the display line therein is only a schematic illustration and does not represent a real display line); that is, display lines corresponding to the respective pieces of associated data are connected together.

Figure 1A:
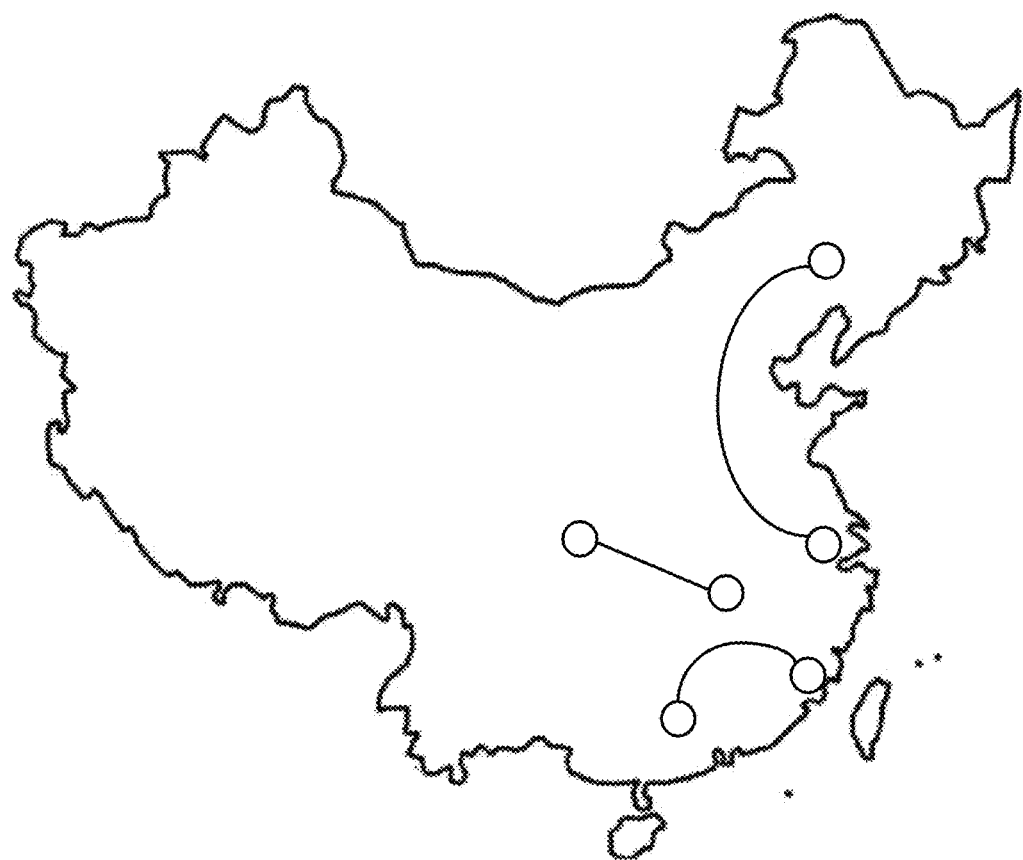
FIGS. 1A-1B are two implementations of a display line according to some embodiments of the disclosure.
Figure 1B:
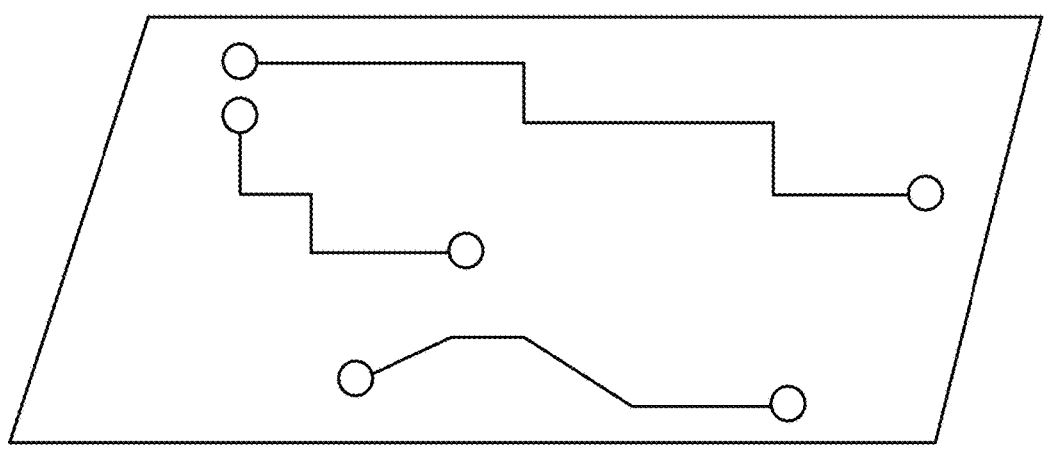

It can be understood that normally a display condition of the GPU should be shown as in FIG. 1A or FIG. 1B; that is, the display lines corresponding to the respective pieces of associated data are separated. Therefore, in the visualization result obtained according to the first implementation, the display lines corresponding to the respective pieces of associated data cannot be explicitly distinguished in some situations, leading to a poor user experience. Therefore, a second implementation is provided below.

The second implementation: the CPU communicates with the GPU once in a data frame and respective feature arrays have connection arrays among them.

Figure 4B:
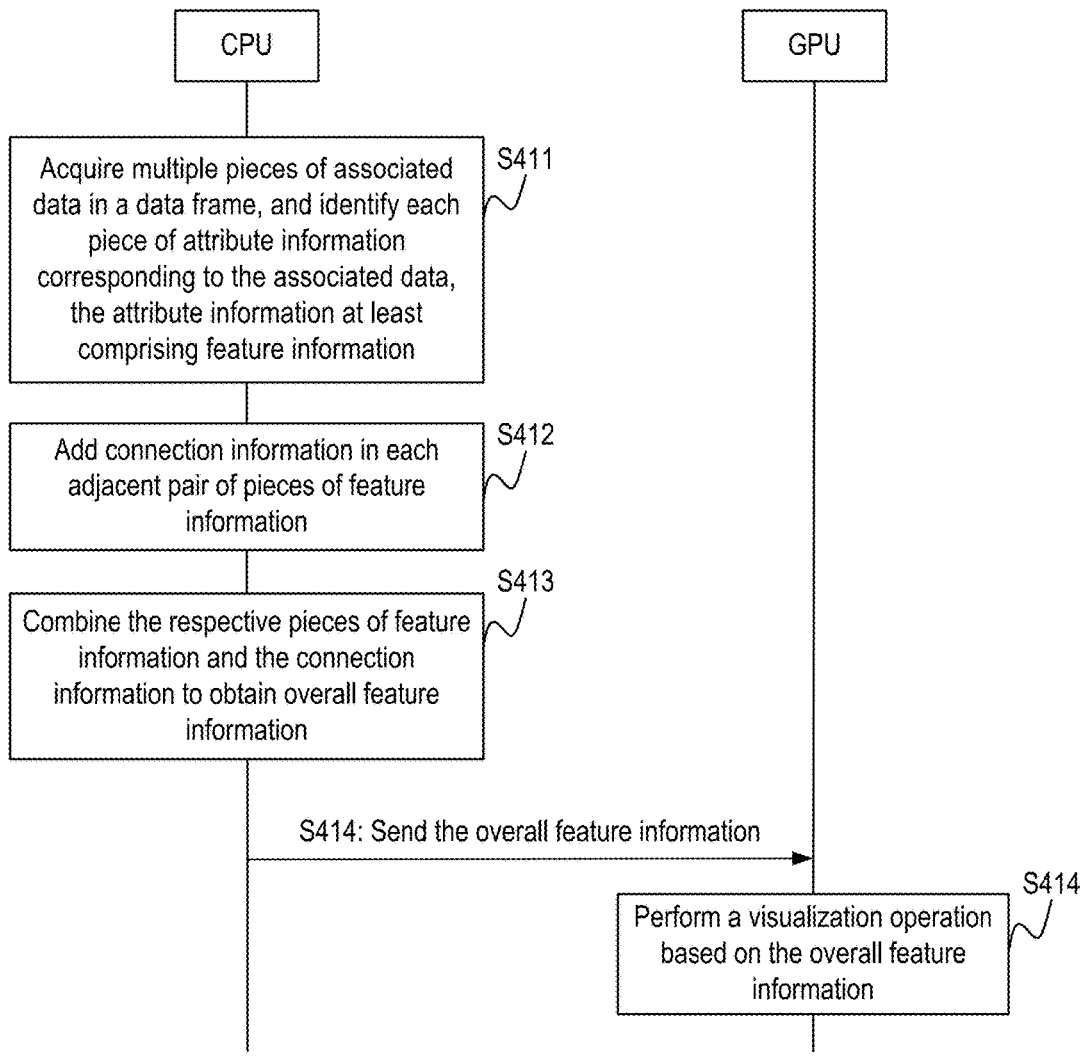

FIG. 4B is a flow diagram illustrating a method for processing data according to some embodiments of the disclosure.

Step S411: the CPU acquires multiple pieces of associated data in a data frame, and identifies attribute information corresponding to the associated data, each piece of attribute information at least comprising feature information. The specific process is similar to step S401 and the associated disclosure is incorporated by reference herein in its entirety.

Step S412: connection information is added in each adjacent pair of pieces of feature information.

In general, display lines corresponding to the respective pieces of associated data may be explicitly distinguished by adding the connection information into each adjacent pair of pieces of feature information.

Specifically, for two adjacent pieces of feature information, end point coordinates of the feature information in a beginning position are acquired and start point coordinates of the feature information in a latter position are acquired. Alternatively, start point coordinates of the feature information in a beginning position are acquired and end point coordinates of the feature information in a latter position are acquired. It can be understood that both methods may be used, provided that the methods used for each adjacent pair of pieces of feature information are consistent during use. Then, connection line data is built based on the start point coordinates and the end point coordinates and the feature information corresponding to the connection line data is identified.

For example, associated data 1 (i.e., feature information 1) has corresponding start point coordinates 1 ($x_{11}$, $y_{11}$, $z_{11}$) and end point coordinates 1 ($x_{12}$, $y_{12}$, $z_{12}$); and associated data 2 (i.e., feature information 2) has corresponding start point coordinates 2 ($x_{21}$, $y_{21}$, $z_{21}$) and end point coordinates 2 ($x_{22}$, $y_{22}$, $z_{22}$). The CPU may then use the end point coordinates 1 ($x_{12}$, $y_{12}$, $z_{12}$) and the start point coordinates 2 ($x_{21}$, $y_{21}$, $z_{21}$) to determine the connection line data. Then, the feature information corresponding to the connection line data is further identified.

Normally, the start point coordinates and the end point coordinates may be used to build a straight line and a linear equation is used as the connection line data. The linear equation is selected because the linear equation is the most straightforward connection line between two points. It goes without saying that other types of connection line data may be built by adopting the start point coordinates and the end point coordinates (since the principles of building the connection line and of the display line are consistent, reference can be made to the process of building the display line in step S302).

The CPU, upon identifying the connection line data, uses a position function to acquire m position points in the connection line data; or randomly selects m position points from the connection line data to build a position array. The number of position points will then be consistent with the number of position points in the position array. Then a color array is built, which apparently also includes m color values. The position array and the color array that correspond to the connection line data are identified as connection information.

The color array in the connection information will be focused below. The purpose of a connection array corresponding to the connection line data is that: the connection information is added into two adjacent pieces of feature information such that respective display lines may be separated visually (actually still connected) in a drawing result obtained after drawing done by the GPU. A user may then be able to visually distinguish respective display lines corresponding to respective pieces of associated data.

It can be understood that, FIG. 1A and FIG. 1B are optimum visualization results. That is, the visualization results only display respective display lines and do not display other line segments. In order to achieve the effects of FIG. 1A and FIG. 1B, in the disclosed embodiments, a transparency of respective color values in the color array of the feature information may be set to 100%.

Figure 5B:
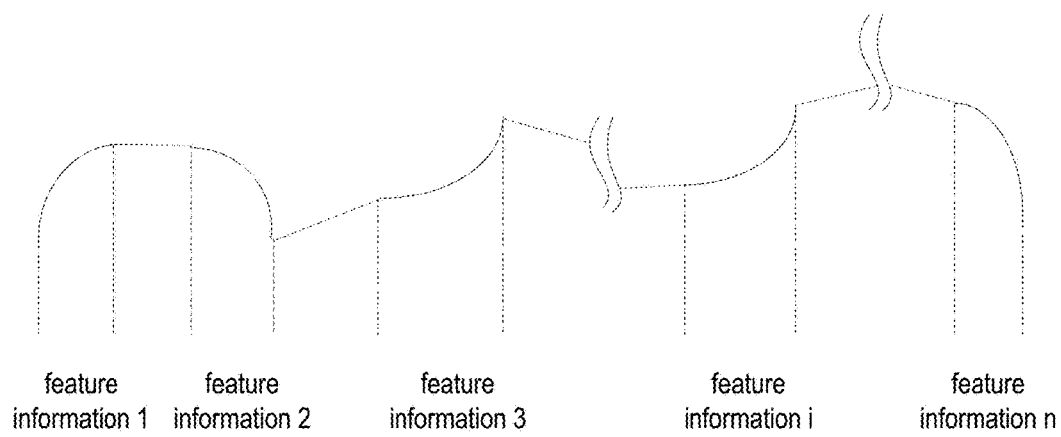

In this manner, the connection line is transparent in the visualization result obtained after drawing done by the GPU. The user cannot see the connection line and can only see the display line corresponding to the associated data, thereby achieving the optimum visualization result (see FIG. 5B in which a transparent connection line is represented by a dashed line).

Certainly, the optimum visualization effect may be achieved by setting the color array of the connection array to a transparent color. On the basis of reducing the visualization effect, as long as the color array of the connection information is guaranteed to be inconsistent with the color array of the feature information will suffice.

When the color arrays of the connection information and the feature information are inconsistent, the user may distinguish the display line and connection line in the visualization result of the GPU. Specific implementations may come in different forms. For example, a yellow color may be used for displaying the color array of the feature information while other colors such as a blue color, a green color, and a red color and the like are used for displaying the connection information.

Alternatively, respective color values in the color value of the feature information are inconsistent (respective color values in the color array are not the same so as to display the directionality of the display line from a start point to an end point); and then respective color values may be set to be consistent in the color array in the connection features.

Of course, other implementations may be adopted to make the color array of the connection information and the color array of the feature information inconsistent, which are not listed in detail herein.

After performing the above-mentioned process on respective adjacent pieces of feature information, respective pieces of connection information may be obtained. Specifically, connection information 1 is added between feature information 1 and feature information 2, connection information 2 is added between feature information 2 and feature information 3; . . . connection information i is added between feature information i and feature information i+1; . . . and connection information n−1 is added between feature information n−1 and feature information n.

Step S413: the respective pieces of feature information and the respective pieces of connection information are combined to obtain one piece of overall feature information.

Assuming that the position array of the connection information is represented by the letter w and the color array of the connection information is represented by the letter y, the overall feature information obtained in this step is as follow:

The combined overall position array is: $[p_{11} \ p_{12} \ p_{13} \ldots p_{1j} \ldots p_{1m} \ w_{11} \ w_{12} \ldots w_{1j} \ldots w_{1m} \ p_{21} \ p_{22} \ p_{23} \ldots p_{2j} \ldots p_{2m} \ w_{21} \ w_{22} \ldots w_{2j} \ldots w_{2m} \ p_{31} \ p_{32} \ p_{33} \ldots p_{3j} \ldots p_{3m} \ldots p_{i1} \ p_{i2} \ p_{i3} \ldots p_{ij} \ldots p_{im} \ w_{i1} \ w_{i2} \ldots w_{ij} \ldots w_{im} \ldots p_{n1} \ p_{n2} \ p_{n3} \ldots p_{nj} \ldots p_{nm}]$.

The combined overall color array is: $[c_{11} \ c_{12} \ c_{13} \ldots c_{1j} \ldots c_{1m} \ y_{11} \ y_{12} \ldots y_{1j} \ldots y_{1m} \ c_{21} \ c_{22} \ c_{23} \ldots c_{2j} \ldots c_{2m} \ y_{21} \ y_{22} \ldots y_{2j} \ldots y_{2m} \ c_{31} \ c_{32} \ c_{33} \ldots c_{3j} \ldots c_{3m} \ldots c_{i1} \ c_{i2} \ c_{i3} \ldots c_{ij} \ldots c_{im} \ y_{i1} \ y_{i2} \ldots y_{ij} \ldots y_{im} \ldots c_{n1} \ c_{n2} \ c_{n3} \ldots c_{nj} \ldots c_{nm}]$.

In order to enable readers to better understand the distinctions between the overall feature information in the second implementation and the overall feature information of the first implementation, underlines are adopted to mark the differences between the described overall feature information. The underlines do not exist in actual implementation.

Step S414: the CPU at least sends the overall feature information to the GPU; and the GPU performs a visualization operation at least based on the overall feature information. Details are described in step S404, and are not repeatedly herein.

In the case where the attribute information only includes the feature information, the CPU only needs to send the overall feature information (the overall position array and the overall color array) to the GPU; and the GPU then performs drawing according to the drawing standard. In the case where the attribute information includes the feature information and the geometric information, the CPU needs to send the overall feature information (the overall position array and the overall color array) and the respective pieces of geometric information to the GPU, and the GPU then performs drawing according to the drawing standard.

In the second implementation, not only the number of times of communication between the CPU and the GPU may be greatly reduced, the user experience during viewing of the visualization result may also be improved.

In the first and the second implementations, communication is performed only once between the CPU and the GPU in a data frame; and thus the number of times of communication between the CPU and the GPU may be greatly reduced in the first and the second implementations.

Additionally, the disclosed embodiments further provide the following two implementations in which the CPU communicates with the GPU for a small number of times. Although the number of times of communication between the CPU and the GPU is still large when compared with the situation where only one communication is performed, the greatly reduced number of communication between the CPU and the GPU still has its advantages when compared with the large number of times of communication in current systems.

In a third implementation, the CPU communicates with the GPU for multiple times in a data frame; and the number of times of the communication is far smaller than the number of pieces of feature information.

Upon acquiring multiple pieces of associated data in a data frame, the multiple pieces of associated data are divided into multiple associated data sets, wherein at least one associated data set comprises two or more pieces of associated data in the multiple pieces of associated data.

In the case where the number of pieces of feature information in the CPU is not defined, the CPU acquires any number of pieces of associated data for a data frame and directly divides the any number of pieces of associated data into the multiple associated data sets.

Due to the display performance of the GPU, a display line corresponding to the feature information cannot be rendered without limitation. Therefore, a preset number of pieces of feature information that may be built may be set in the CPU. In this execution process of the disclosed embodiments, since the GPU may build a partial number of pieces of feature information, a remaining number is used to represent the number of pieces of feature information that may be additionally built by the CPU. The remaining number=the preset number−the partial number.

Thus, the CPU may determine whether the number of the multiple pieces of associated data is larger than the remaining number after receiving multiple pieces of associated data in a data frame. If not, the multiple pieces of associated data are divided into the multiple associated data sets. If so, screening several pieces of associated data from the multiple pieces of associated data, and if the number of the several pieces of associated data is not larger than the remaining number, dividing the several pieces of associated data into multiple associated data sets.

Using the situation where the number of pieces of feature information in the CPU is not defined as an example. It is assumed that the CPU obtains n pieces of feature information in a data frame. The CPU divides the n pieces of feature information into multiple associated data sets; each associated data set comprises at least one piece of feature information; and the number of the associated data sets is far smaller than the number of pieces of feature information.

Then, each associated data set is processed according to the first implementation to achieve the goal that one associated data set corresponds to one piece of overall feature information and the specific process will not be repeated.

In a fourth implementation, the CPU communicates with the GPU multiple times and the number of times of the communication is far smaller than the number of pieces of feature information. A connection array exists between respective pieces of feature arrays.

Upon acquiring multiple pieces of associated data in a data frame, the multiple pieces of associated data are divided into multiple associated data sets, wherein at least one associated data set comprises two or more pieces of associated data in the multiple pieces of associated data. Reference of the specific process can be made by referring to the third implementation and details are not repeated herein but are incorporated by reference in their entirety.

Using the situation where the number of pieces of feature information in the CPU is not defined as an example. It is assumed that the CPU obtains n pieces of feature information in a data frame. The CPU divides the n pieces of feature information into multiple associated data sets; each associated data set comprises at least one piece of feature information; and the number of the associated data sets is far smaller than the number of pieces of feature information.

Then, each associated data set is processed according to the first implementation to achieve the goal that one associated data set corresponds to one piece of overall feature information; and moreover, connection information exists between each adjacent pair of pieces of feature information in the associated data sets; the specific process will not be repeated.

In the third and fourth implementations, the CPU may send n pieces of feature information to the GPU for multiple times; and the number of times of communication between the CPU and the GPU is the same as the number of associated data sets. Since the number of the associated data sets is far smaller than the number of pieces of feature information, the number of times of communication between the CPU and the GPU may also be greatly reduced in the third and fourth implementations.

In the four implementations introduced above, the CPU sends the overall feature information to the GPU; and then performs a rendering operation based on the overall feature information to obtain rendering data; and performs a visualization operation by using the rendering data and obtains a visualization result corresponding to the overall feature information.

Specifically, the GPU may utilize drawing software to visualize the position array and the color array in the overall feature information on the map. In current systems, the GPU normally adopts a canvas-based drawing standard to visualize the feature information and the current rendering efficiency of the GPU is not high.

In order to improve the rendering efficiency, the disclosed embodiments utilize the WebGL drawing standard to visualize the feature information. The WebGL drawing standard is a 3D drawing standard of a web client; such drawing technology standard allows a combination of JavaScript with OpenGL ES 2.0; and WebGL may provide hardware-accelerated 3D rendering for HTML5 Canvas by adding JavaScript binding of OpenGL ES 2.0, thereby improving the rendering efficiency of the GPU.

Below the attribute information including the feature information is used as an example to illustrate the rendering process in detail. It can be known from the execution process of the CPU and the GPU in a data frame that in the first and second implementations, the overall feature information needs to be rendered once after the GPU receives the overall feature information in a data frame.

In the third and fourth implementations, since the GPU may receive multiple pieces of overall feature information in a data frame, the multiple pieces of overall feature information need to be rendered multiple times. That is to say, the GPU performs the rendering process at least once in a data frame; that is, the GPU needs to perform the rendering process in each data frame.

Therefore, in order to improve the rendering efficiency of the GPU, the disclosed embodiments provide the following technical feature. The GPU performs pre-rendering based on preset overall feature information to obtain rendering data.

The rendering data mainly includes the overall feature information and the intermediate data of the rendering process. As such, in an actual execution process, the GPU, upon receiving the overall feature information sent from the CPU, does not need to perform rendering based on the overall feature information; and can obtain updated rendering data by only updating the overall feature information in the rendering data; and then displays on the map based on the updated rendering data. Since the GPU does not need to perform the rendering process based on the overall feature information, the rendering efficiency of the GPU may be greatly improved.

Prior to performing the pre-rendering process, the specific implementation (the first implementation, the second implementation, the third implementation or the fourth implementation) of the CPU in the disclosed embodiments will be determined by a person skilled in the art.

If it is determined that the first implementation or the second implementation (the CPU communicates with the GPU once) is adopted, a first pre-rendering process is correspondingly adopted in the data processing device; and if it is determined that the third implementation or the fourth implementation (the CPU communicates with the GPU for multiple times) is adopted, a second pre-rendering process is correspondingly adopted in the data processing device.

The first pre-rendering process and the second pre-rendering process are introduced in detail below.

The GPU in the data processing device is used for receiving the overall feature information sent from the CPU and rendering a display line corresponding to the overall feature information. Due to hardware limitations of the GPU, the GPU may render at most a given number of display lines in one data frame.

Therefore, it is assumed that the number of pieces of display line data that the CPU may build at most is the preset number; or the number of pieces of feature information that may be built at most is the preset number and the preset number is smaller than the given number. In this way, the number of display lines rendered by the GPU does not exceed the given number.

It can be found from the process shown in FIG. 3 that in the data processing device, one piece of associated data corresponds to one piece of display line data; one piece of display line data corresponds to one piece of feature information (the position array and the color array); and one piece of feature information corresponds to one display line. Therefore, in the case where only a preset number of pieces of display line data can be built at most, the CPU may also correspondingly build at most a preset number of pieces of feature information.

Figure 6:
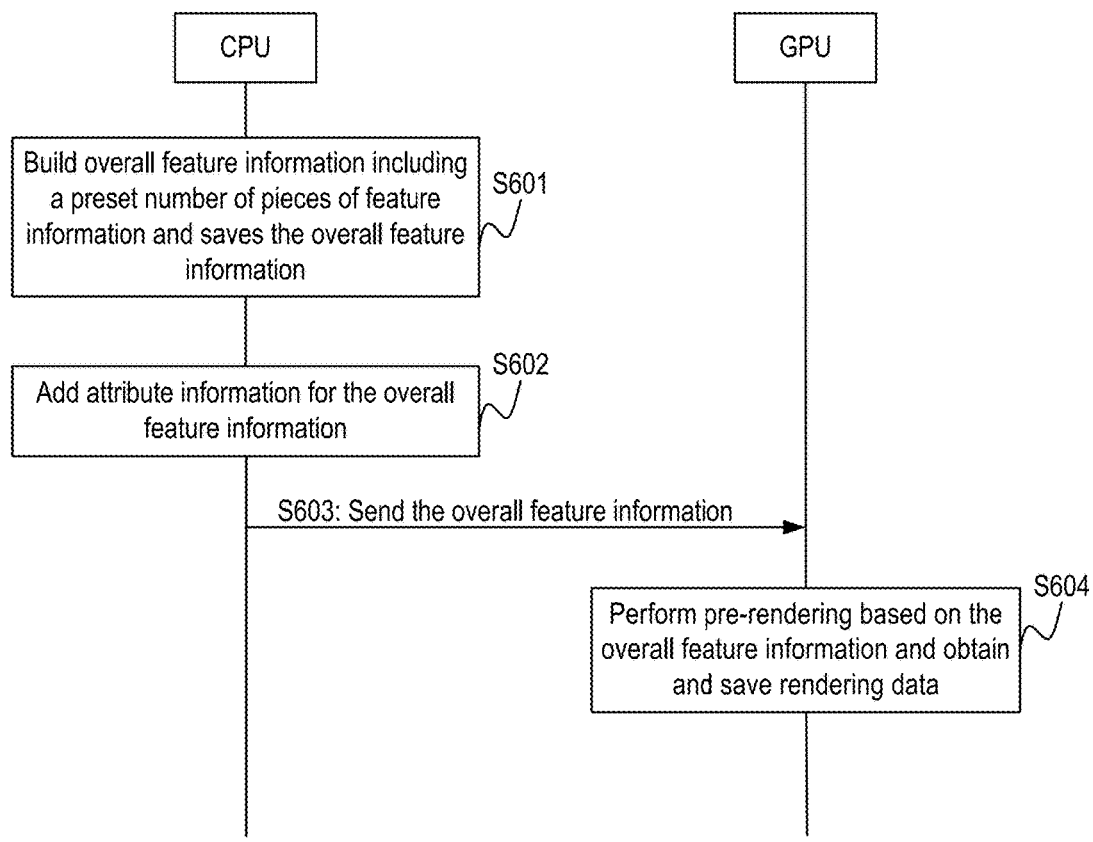
FIG. 6 is a flow diagram illustrating a method for processing data according to some embodiments of the disclosure.

FIG. 6 is a flow diagram illustrating a method for processing data according to some embodiments of the disclosure.

Step S601: the CPU builds overall feature information including a preset number of pieces of feature information and saves the overall feature information.

The CPU builds the preset number of pieces of feature information. Specially, the CPU may receive a preset number of pieces of associated data, and acquires a preset number of pieces of feature information according to the processes of steps S301 to S303.

Since in the first and second implementations, the CPU communicates with the GPU once in a data frame, the CPU combines the preset number of pieces of feature information and obtains the overall feature information.

The CPU may identify the overall feature information corresponding to the preset number of pieces of feature information according to the first implementation that FIG. 4A corresponds to or the second implementation that FIG. 4B corresponds to. Assuming that the preset number is 10, the CPU combines 10 pieces of feature information and obtains the overall feature information.

Step S602: the CPU adds attribute information for the overall feature information.

In order to facilitate subsequent use of the overall feature information, the attribute information needs to be added for the overall feature information. Specifically, please refer to the following processes.

(1) a feature identifier is set for each piece of feature information and position point identifiers are set for all position points in the overall feature information.

The CPU sets different feature identifiers for each piece of feature information to distinguish the respective pieces of feature information. Assuming that the preset number of pieces of feature information is 10, then feature information 1 corresponds to feature identifier 1; feature information 2 corresponds to feature identifier 2; ... and feature information 10 corresponds to feature identifier 10.

The overall feature information includes a plurality of position points and the CPU imparts a position point identifier for each position point. Assuming that each piece of feature information has eight position points, then the position array of each piece of feature information has eight position coordinates and the color array has eight color coordinates. Then, an overall position array of the overall feature information has position coordinates of 80 position points and an overall color array also has color values of 80 position points.

In the case where Arabic numerals are used to impart different identifiers for all position points, respective position point identifiers in the overall position array may be 1, 2, 3, ... 80 sequentially; and respective position points in the overall color array may also be 1, 2, 3, ... 80 sequentially. Ordered letters may also be adopted to impart different identifiers for respective position points. Certainly, identification may also be performed using other methods, which is not limited herein.

(2) a position point identifier set corresponding to each piece of feature information is determined and a correspondence relationship between the feature identifier of each piece of feature information and the position point identifier set corresponding thereto is built.

Continuing with the above-mentioned examples and taking feature information 1 as an example, feature information 1 corresponds to position point identifier 1 through position point identifier 8, then position point identifier 1 to position point identifier 8 constitute position point identifier set 1 of feature information 1. Then, a correspondence relationship between feature identifier 1 of feature information 1 and position point identifier set 1 is built.

(3) a state identifier is set for the feature identifier corresponding to each piece of feature information.

The state identifier is added for the feature identifier corresponding to each piece of feature information, wherein the state identifier is used for indicating a use state of the feature information. If one piece of feature information is in use, the state identifier indicates that the feature information is in a wake-up state; and if one piece of feature information is not in use, the state identifier indicates that the feature information is in a sleep state.

The above-mentioned correspondence relationships are expressed in Table 1.

TABLE 1

| position point identifier | position point set | feature identifier | state identifier |
|---|---|---|---|
| position point identifier 1 to position point identifier 80 | position point identifier 1 to position point identifier 8 | feature identifier 1 | state identifier 1 |
| | position point identifier 9 to position point identifier 16 | feature identifier 2 | state identifier 2 |
| | ... | ... | ... |
| | position point identifier 72 to position point identifier 80 | feature identifier 10 | state identifier 10 |

(4) a wake-up feature identifier set and a sleep feature identifier set are built.

The feature information corresponding to each feature identifier in sleep feature identifier set is in an unused sleep state; and the feature information corresponding to each feature identifier in the wake-up feature identifier set is in an in-use wake-up state.

For a preset number of pieces of feature information, if one piece of feature information is in a wake-up state, the feature identifier of this feature information is added to the wake-up feature identifier set. If one piece of feature information is in a sleep state, the feature identifier of this feature information is added to the sleep feature identifier set. The sum of the number of pieces of feature information in the wake-up feature identifier set and the sleep feature identifier set equals to the preset number.

Step S603: the overall feature information is sent to the GPU.

Step S604: the GPU performs pre-rendering based on the overall feature information and obtains and saves rendering data.

The GPU performs pre-rendering based on the overall feature information and obtains rendered rendering data and then saves the rendering data. The rendering data includes two parts: one part is the overall feature information and the other part is the intermediate data in the rendering process.

During the above-mentioned pre-rendering process, the CPU may save the overall feature information and the attribute information corresponding to the overall feature information. The GPU may save the rendering data obtained after pre-rendering.

In the case of the above-mentioned first pre-rendering, the specific execution process of the data processing device is introduced below.

Figure 7:
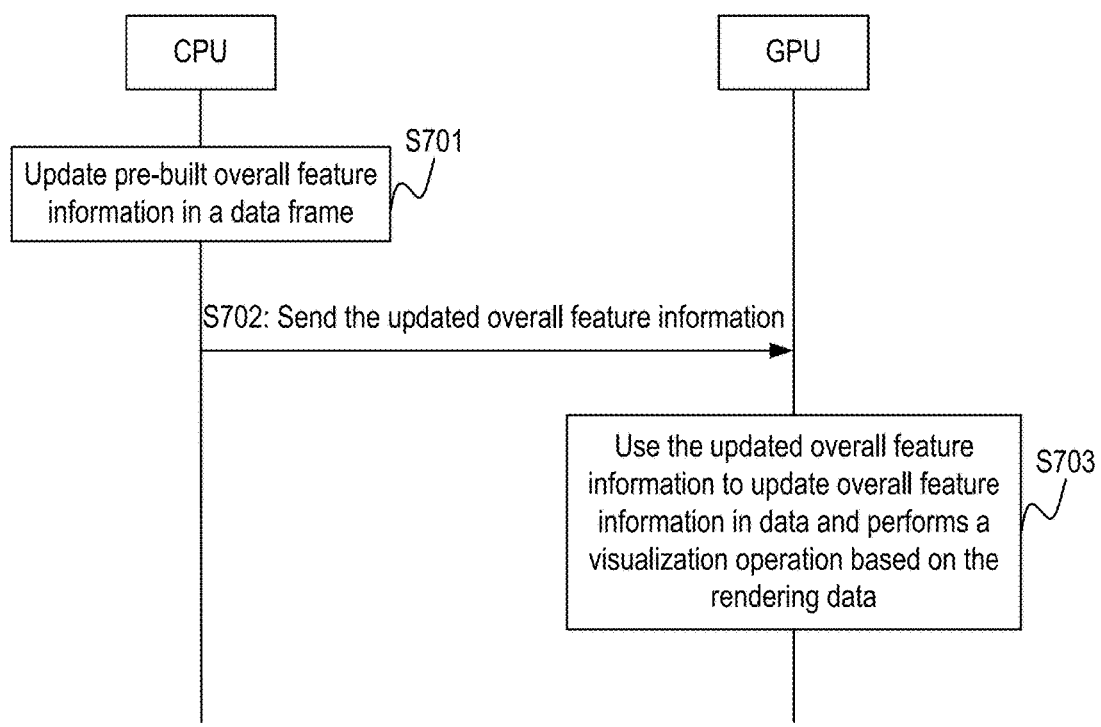
FIG. 7 is a flow diagram illustrating a method for processing data according to some embodiments of the disclosure.

FIG. 7 is a flow diagram illustrating a method for processing data according to some embodiments of the disclosure.

Step S701: the CPU updates pre-built overall feature information in a data frame.

After the pre-rendering process shown in FIG. 6, the overall feature information obtained by combining the preset number of pieces of feature information is already stored in the CPU. Since specific data values of respective position points in the current overall feature information are data values in the previous data frame, in this data frame, data values of respective position points in the overall feature information needs to be updated such that the overall feature information is applicable to the data frame.

Updating the overall feature information includes two aspects: the first aspect is that the feature information corresponding to the feature identifiers in the sleep state in the overall feature information is updated; and the second aspect is that the feature information corresponding to the feature identifiers in the wake-up state in the overall feature information is updated. Below the two aspects are introduced respectively.

The first aspect: the feature information corresponding to the feature identifiers in the sleep state in the overall feature information is updated. The main purpose of this aspect is to update associated data obtained in this data frame into the overall feature information.

Multiple pieces of associated data are obtained in a data frame; feature information corresponding to the associated data is identified; and specific data values of respective pieces of feature information are updated to specific data values in the overall feature information.

Taking the target feature information in respective pieces of feature information as an example, the process of updating the feature information into the overall feature information is introduced below.

Figure 8:
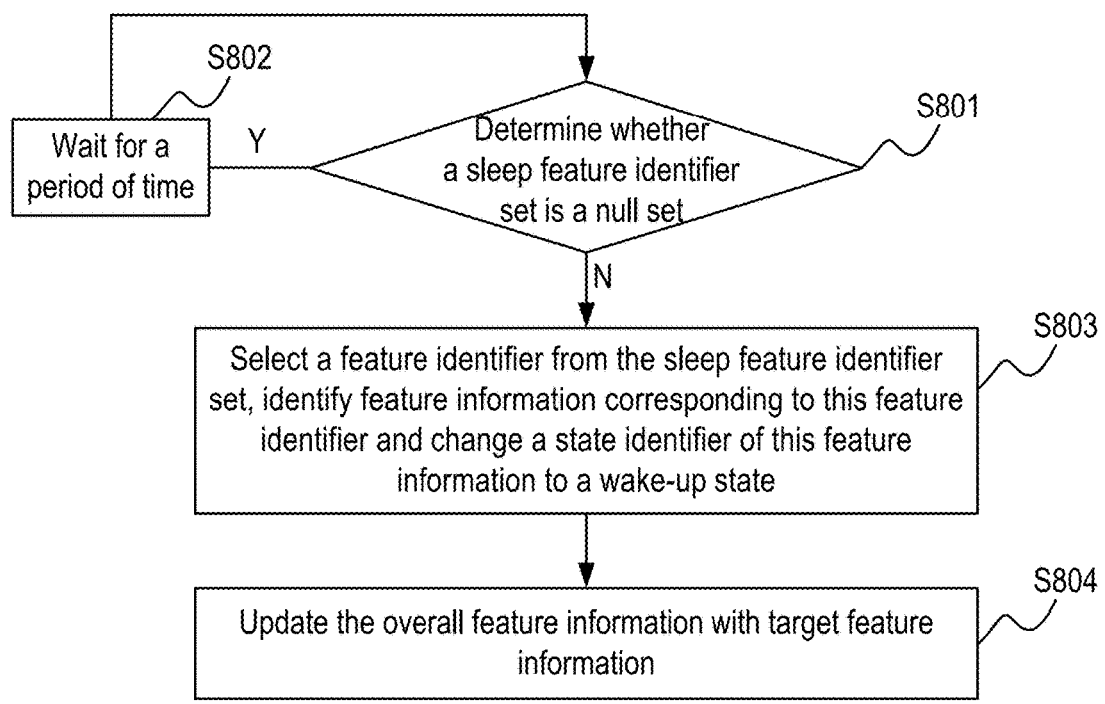
FIG. 8 is a flow diagram illustrating a method for processing data according to some embodiments of the disclosure.

FIG. 8 is a flow diagram illustrating a method for processing data according to some embodiments of the disclosure.

Step S801: it is determined whether the sleep feature identifier set is a null set; and if yes, the process proceeds to step S802; otherwise the process proceeds to step S803.

Because all the feature identifiers in the wake-up feature identifier set are being used, upon receiving new associated data, specific values of target feature information are updated to specific data values of feature information corresponding to sleep feature identifiers.

First, the CPU determines whether the sleep feature identifier set is a null set; and if the sleep feature identifier set is a null set, it indicates that the preset number of pieces of feature information are in the wake-up state and are being used. If the sleep feature identifier set is not a null set, it indicates that the preset number of pieces of feature information have the feature information that is in the sleep state and the feature information is not used.

Step S802: the process waits for a period of time and then proceeds to step S801.

The CPU determines that the sleep feature identifier set is a null set; and it indicates that the preset number of pieces of feature information in the CPU are currently all in the wake-up state, and there is no available feature information. Therefore, step S801 may be performed after waiting for a period of time.

Step S803: a feature identifier is selected from the sleep feature identifier set; feature information corresponding to this feature identifier is identified and a state identifier of this feature information is changed to a wake-up state.

The CPU determines whether the sleep feature identifier set is a null set; and if not, it indicates that there is available feature information. Therefore, an available feature identifier is selected from the sleep feature identifier set; then a state identifier corresponding to this feature information is changed to a wake-up state; this feature identifier is then added to the wake-up feature identifier set.

Step S804: update the overall feature information with target feature information.

Because in the attribute information of the overall feature information, a correspondence relationship exists between each feature identifier and a position point identifier set corresponding thereto, a position point identifier set corresponding to the feature identifier selected in step S803 can be identified from the overall feature information, thereby making it possible to identify the feature information from the overall feature information according to the position point identifier set. The specific data values of the target feature information are updated to the specific data values of feature information corresponding to the feature identifiers.

For example, a position point identifier set corresponding to feature identifier 1 is position point identifier 1 to position point identifier 8; and 8 position points corresponding to position point identifier 1 to position point identifier 8 are identified from the overall feature information. A position array and a color array that correspond to 8 position points are feature information corresponding to feature identifier 1; and then specific data values of the position array of the target feature information are updated to corresponding data values of 8 position points that correspond to position point identifier 1 to position point identifier 8.

The CPU may continuously perform the process shown in FIG. 8 in a data frame until all pieces of feature information corresponding to the data frame are updated into the overall feature information; or until the sleep feature identifier set is a null set.

The second situation: the feature information that is already in a wake-up state is updated to update the overall feature information.

Each piece of feature information has a position array and a color array; in order to optimize the visualization result of the GPU, the feature information may be displayed in a dynamic manner in this embodiment so as to display the directionality from a start point to an end point by using a dynamic effect.

Assuming that one piece of feature information has m position points. In order to display the dynamic effect of the feature information, the feature information needs to be updated once in all m data frames. As such, a dynamic effect of a display line may be simulated through a variation in the shade of the color; for example, the process of a shooting-star falling is simulated between a start point and an end point to show the directionality from the start point to the end point.

Therefore, in each data frame in this embodiment, in addition to updating the identified feature information into the overall feature information in the above-mentioned first situation, the feature information that is already in the wake-up state may also be updated in this embodiment.

Specifically, a position mapping function $f(\text{index}, \text{data})$ is used to update a position array corresponding to each piece of feature information in the wake-up feature identifier; and a color mapping function $g(\text{index}, \text{data})$ is used to update a color array corresponding to each piece of feature information in the wake-up feature identifier.

The third situation: the feature information is set to an unavailable state for a display line that completes displaying.

In one piece of feature information that is already in the wake-up state, an identifier state of this feature information is changed to a sleep state after the completion of the dynamic display. Assuming that one piece of feature information has m position points. After m data frames, the display of this feature information is completed, and this feature information may be recycled; that is, the feature information is in the sleep state.

If one piece of feature information is in the sleep state, it indicates that the display of this feature information is already completed. The feature information does not need to be displayed again in the visualization result of the GPU. Therefore, in order to make the feature information in the sleep state invisible to a user in the visualization result, an invisible operation may be performed on the feature information that is just in the sleep state; this feature information will then be in an invisible state.

Specifically, the transparency in the color array of this feature information is set to 100% such that the GPU may display the feature information that is in the sleep state by means of a transparent line segment. Alternatively, respective position point coordinates are set to one coordinate such that this feature information will correspond to one position point in the visualization result; and this position point is invisible to the user over the overall line segment.

Since a recycling mechanism is established in the present application, respective pieces of feature information in the overall feature information may be repeatedly used. The CPU will not need to re-build the overall feature information and the GPU will not need to repeatedly perform rendering, so that the display efficiency of the associated data can be improved.

Returning to FIG. 7, in step S702, the updated overall feature information is sent to the GPU.

The CPU, after updating the overall feature information once in a data frame according to the above-mentioned three situations, sends the updated feature information again to the GPU.

Step S703: the GPU uses the overall feature information to update overall feature information in the rendering data and performs a visualization operation based on the rendering data.

That is to say that, the overall feature information sent from the central processing unit is received; the overall feature information in pre-built rendering data is updated based on the overall feature information; and a visualization operation is performed by using the updated rendering data; and a visualization result corresponding to the overall feature information is obtained.

The rendering data obtained after performing rendering based on the overall feature information is already stored in the GPU; and in order to enable the visualization result to be applicable to the overall feature information at this time, the GPU may update specific values in the overall feature information sent from the CPU to specific values in the existing overall feature information. As such, the GPU may perform display based on the updated overall feature information.

Thus, the GPU does not need to perform the rendering process again, and thereby a great amount of GPU resources can be saved.

Figure 9:
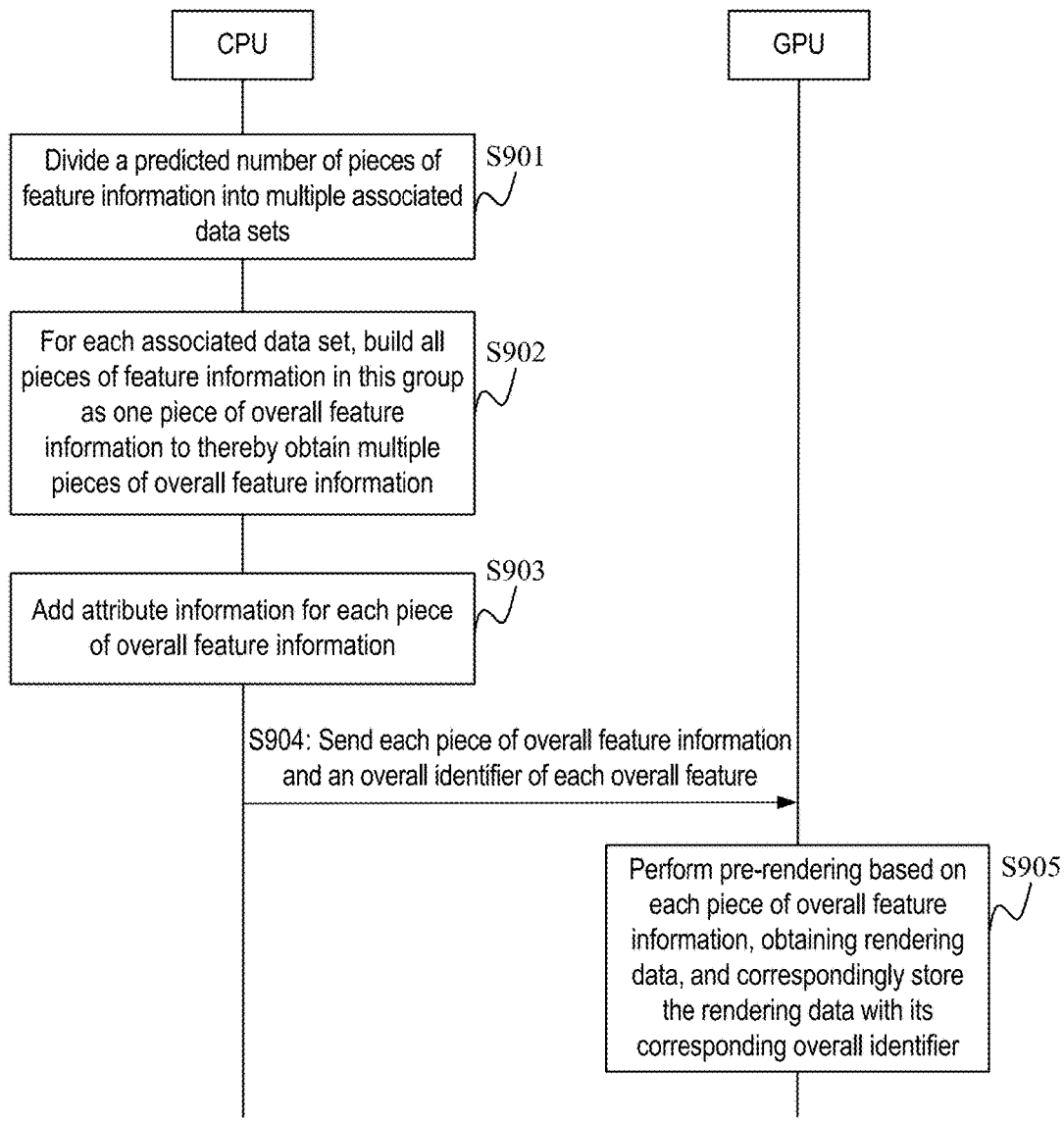
FIG. 9 is a flow diagram illustrating a method for processing data according to some embodiments of the disclosure.

FIG. 9 is a flow diagram illustrating a method for processing data according to some embodiments of the disclosure.

Step S901: the CPU divides a preset number of pieces of feature information into multiple associated data sets.

Regarding the process of the CPU acquiring the preset number of pieces of feature information, reference can be made to step S601. Details are not repeated herein but are incorporated by reference in their entirety.

Since in the third implementation and the fourth implementation, the CPU communicates with the GPU for multiple times in a data frame, the CPU divides the preset number of pieces of feature information into multiple associated data sets; and the specific number of pieces of feature information in each associated data set may be preset by a person skilled in the art.

Step S902: for each associated data set, the CPU builds all pieces of feature information in this associated data set as one piece of overall feature information to thereby obtain multiple pieces of overall feature information and save the multiple pieces of overall feature information.

For each group of feature information, the CPU may identify the overall feature information corresponding to all pieces of feature information in this group according to the first implementation that FIG. 4A corresponds to or the second implementation that FIG. 4B corresponds to.

Step S903: the CPU adds attribute information for each piece of overall feature information.

(1) a feature identifier is set for each piece of feature information and position point identifiers are set for all position points in the overall feature information.

(2) a position point identifier set corresponding to each piece of feature information is determined; and a correspondence relationship between each piece of feature information and the position point identifier set corresponding thereto is built.

(3) an overall identifier is added for each piece of overall feature information and a correspondence relationship between the overall identifier and the feature identifier set corresponding thereto is built.

Since multiple pieces of feature information exist in this embodiment, in order to distinguish one piece of feature information from another, an identifier may be added for each piece of overall feature information. Because each piece of overall feature information includes a portion of feature information, in order to clearly determine which respective pieces of feature information belong to which overall feature information, the feature identifier set corresponding to each overall identifier is built and a correspondence relationship between the overall identifier and the feature identifier set is built.

For example, assuming that 10 pieces of feature information (feature information 1, feature information 2, . . . feature information 10) exist, and the number of pieces of overall feature information is 3. For example, feature information 1 to feature information 3 correspond to overall feature information 1, feature information 4 to feature information 7 correspond to overall feature information 2, and feature information 8 to feature information 10 correspond to overall feature information 3.

Then, a feature identifier set corresponding to identifier 1 that corresponds to the overall feature information comprises feature identifier 1 of feature information 1, feature identifier 2 of feature information 2, and feature identifier 3 of feature information 3.

(4) a state identifier is set for the feature identifier corresponding to each piece of feature information.

Schematic views of adding attribute information for the overall feature information can be seen in Table 2 and Table 3.

TABLE 2

| overall identifier | position point identifier | feature identifier set |
|---|---|---|
| overall identifier 1 | position point identifier 1 to position point identifier 24 | feature identifier 1 to feature identifier 3 |
| overall identifier 2 | position point identifier 25 to position point identifier 56 | feature identifier 4 to feature identifier 7 |
| overall identifier 3 | position point identifier 57 to position point identifier 80 | feature identifier 9 to feature identifier 10 |

TABLE 3

| position point set | feature identifier | state identifier |
|---|---|---|
| position point identifier 1 to position point identifier 8 | feature identifier 1 | state identifier 1 |
| position point identifier 9 to position point identifier 16 | feature identifier 2 | state identifier 2 |
| . . . | . . . | . . . |
| position point identifier 72 to position point identifier 80 | feature identifier 10 | state identifier 10 |

(5) a wake-up feature identifier set and a sleep feature identifier set are built.

The processing procedures of (1), (2), (4), and (5) are consistent with the processing procedures in the first pre-rendering and are thus not repeated herein.

Step S904: each piece of overall feature information and an overall identifier of each overall feature are sent to the GPU one by one.

Step S905: the GPU performs pre-rendering based on each piece of overall feature information; obtains rendering data; and accordingly stores the rendering data with its corresponding overall identifier.

During the above-mentioned pre-rendering process, the CPU may save the overall feature information and the attribute information corresponding to the overall feature information. The GPU may save the rendering data obtained after pre-rendering and the corresponding overall identifier.

In the case of the above-mentioned second pre-rendering, the specific execution process of the data processing device is introduced.

Figure 10:
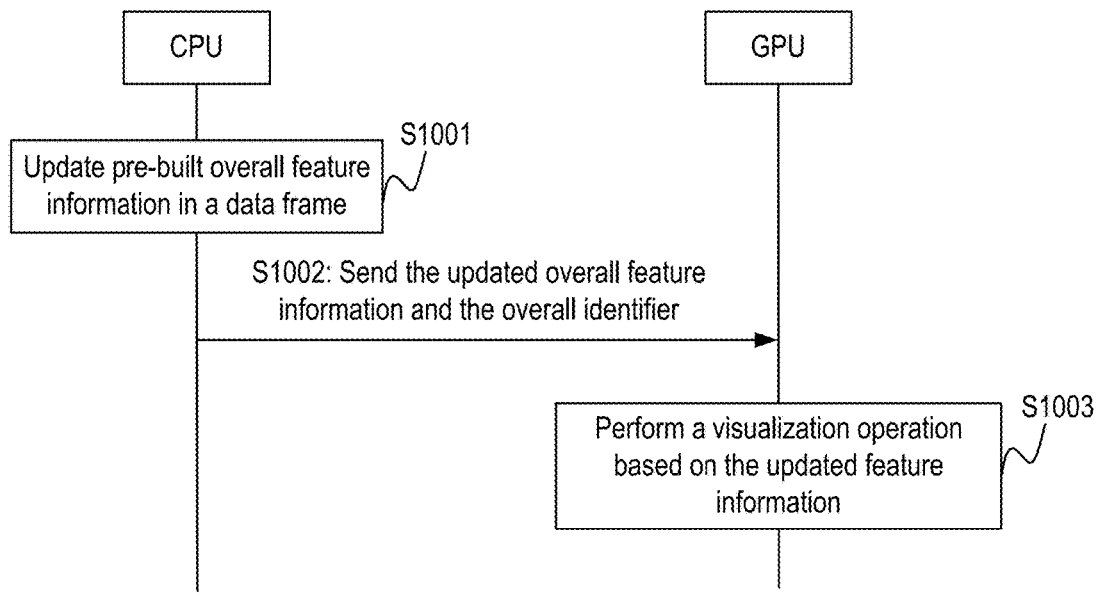
FIG. 10 is a flow diagram illustrating a method for processing data according to some embodiments of the disclosure.

FIG. 10 is a flow diagram illustrating a method for processing data according to some embodiments of the disclosure.

Step S1001: the CPU updates multiple pieces of pre-built overall feature information in a data frame.

After the pre-rendering process shown in FIG. 9, the overall feature information obtained by combining the preset number of pieces of feature information is already stored in the CPU, and is represented by preset overall feature information herein.

Updating the overall feature information includes three situations which are respectively introduced below.

The first situation: multiple pieces of associated data are received in a data frame; feature information corresponding to the associated data is identified and multiple pieces of pre-built overall feature information are updated based on respective pieces of feature information.

Taking the target feature information in respective pieces of feature information as an example, the process of updating the target feature information into the overall feature information is introduced below.

Figure 11:
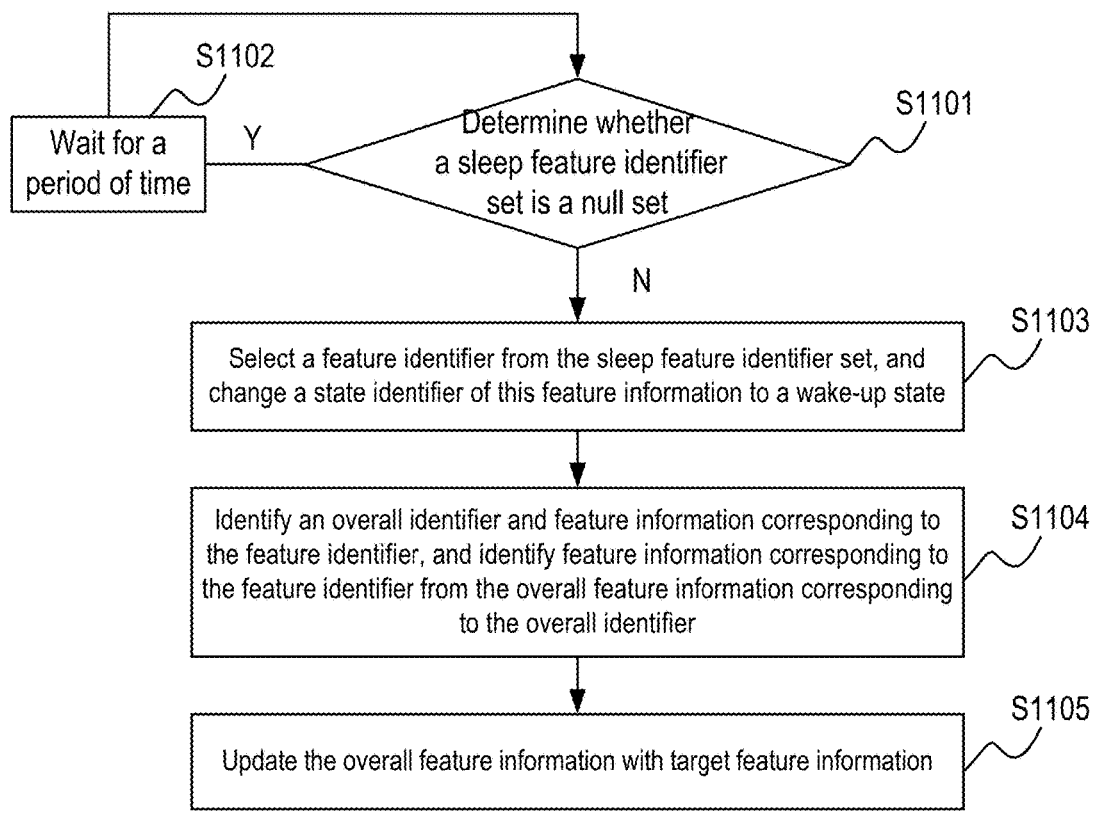
FIG. 11 is a flow diagram illustrating a method for processing data according to some embodiments of the disclosure.

FIG. 11 is a flow diagram illustrating a method for processing data according to some embodiments of the disclosure.

Step S1101: it is determined whether the sleep feature identifier set is a null set; and if yes, the process proceeds to step S1102; otherwise the process proceeds to step S1103.

Step S1102: the process waits for a period of time and then proceeds to step S1101.

Step S1103: a feature identifier is selected from the sleep feature identifier set; and a state identifier of this feature information is changed to a wake-up state.

Step S1104: an overall identifier corresponding to this feature identifier is identified and overall feature information corresponding to the overall identifier is identified. Feature information corresponding to the feature identifier is identified from the overall feature information corresponding to the overall identifier.

Since multiple pieces of overall feature information exist in the second pre-rendering process, the overall identifier corresponding to this feature identifier is firstly identified; and the overall feature information corresponding to the overall identifier is identified. Then, a feature identifier set corresponding to the feature identifier is identified from the overall feature information; and the feature information corresponding to the feature identifier set is identified from the overall feature information.

Step S1105: pdate the overall feature information with target feature information.

The feature information corresponding to this feature identifier is identified from the overall feature information; and the specific data values of the target feature information are updated to the specific data values of this feature information.

The CPU may continuously perform the process shown in FIG. 11 in a data frame until all pieces of feature information corresponding to the data frame are updated into the overall feature information; or until the sleep feature identifier set is a null set.

The second situation: the feature information that is already in a wake-up state is updated to update the overall feature information.

The third situation: the feature information is set to an unavailable state for a display line that completes displaying.

The specific execution processes of the second situation and the third situation are already described in detail in the process shown in FIG. 7. Details are not repeated herein.

Next, please refer to FIG. 10 and proceeds to step S1002: the updated overall feature information and the overall identifier are sent to the GPU.

The CPU, after updating the overall feature information once in a data frame according to the above-mentioned three situations, sends the updated overall feature information and the overall identifier corresponding to the overall feature information again to the GPU.

Step S1003: the GPU performs a visualization operation based on the updated feature information. That is to say, the GPU receives the overall feature information and an overall identifier sent from the central processing unit; identify rendering data corresponding to the overall identifier in multiple pre-built pieces of rendering data; update overall feature information in the pre-built rendering data based on the overall feature information; and perform a visualization operation by using the updated rendering data and obtain a visualization result corresponding to the overall feature information.

Functions of the methods of the embodiments, when achieved in the form of software function units and sold or used as an independent product, can be stored in a computing device-accessible storage medium. Based on such understanding, part of the embodiments of the present application that make a contribution to current systems or part of the technical solutions may be embodied in the form of a computer software product that is stored in a storage medium, including several instructions to enable a computing device (which may be a personal computer, a server, a mobile computing device or a network facility, etc.) to execute all or some steps of the methods of respective embodiments of the present application. The foregoing storage medium can be various media capable of storing program codes, including a USB flash disk, a mobile hard disk, a read-only memory (ROM), a random access memory (RAM), a disk or a compact disk.

Each embodiment in the disclosure is described in a progressive manner, with each embodiment focusing on parts different from other embodiments, and reference can be made to each other for identical and similar parts among various embodiments.

Those skilled in the art may implement or use disclosed embodiments through the above-mentioned descriptions. Various modifications to these embodiments will be apparent to those skilled in the art, and general principles defined in the disclosure may be practiced in other embodiments without departing from the spirit or scope of the disclosure. Therefore, the disclosure will not be limited to these illustrated embodiments, but shall accord with the widest scope consistent with the principles and novel characteristics disclosed above.

What is claimed is:

1. A method comprising:
    receiving a data frame at a central processing unit (CPU), the data frame including a plurality of pieces of associated data, the associated data describing a set of points between a start point and an end point;
    identifying, by the CPU, feature information corresponding to the plurality of pieces of associated data, the feature information representing a property of at least one point in the set of points;
    generating, by the CPU, overall feature information by combining at least a portion of the feature information; and
    sending, by the CPU, the overall feature information to a graphics processing unit (GPU) for visually rendering the overall feature information.

2. The method of claim 1 wherein feature information comprises a position array and a color array, and wherein combining at least a portion of the feature information comprises:
    combining, by the CPU, position arrays of respective pieces of feature information to obtain an overall position array;
    combining, by the CPU, color arrays of respective pieces of feature information to obtain an overall color array; and
    identifying, by the CPU, the overall position array and the overall color array as the overall feature information.

3. The method of claim 1 wherein the pieces of associated data are sequentially ordered and wherein the method further comprises:
    identifying, by the CPU, adjacent pieces of associated data in the plurality of pieces of associated data based on a start point coordinate of a first piece of associated data and an end point coordinate of a second piece of associated data;
    generating, by the CPU using a position function, a position array comprising a plurality of position points connecting the first piece of associated data to the second piece of associated data;
    generating, by the CPU, a color array comprising a plurality of color values corresponding to each of the plurality of position points in the position array;
    generating, by the CPU, connection information based on the position array and the color array; and
    inserting, by the CPU, the connection information between feature information associated with the first piece of associated data and feature information associated with the second piece of associated data.

4. The method of claim 1 wherein prior to generating overall feature information by combining at least a portion of the feature information the method comprises dividing the plurality of pieces of associated data into a plurality of sets, wherein at least one set comprises two or more pieces of associated data in the plurality of pieces of associated data.

5. The method of claim 4 wherein generating overall feature information by combining at least a portion of the feature information comprises generating corresponding overall feature information for each of the sets, and wherein sending the overall feature information to the GPU comprises individually sending the corresponding overall feature information corresponding to each set.

6. The method of claim 1 further comprising:
    performing, by the GPU, a rendering operation based on the overall feature information and obtaining rendering data;
    performing, by the GPU, a visualization operation using the rendering data; and
    obtaining, by the GPU, a visualization result.

7. The method of claim 1 further comprising:
    setting, by the CPU, a feature identifier for each piece of feature information;
    assigning, by the CPU, a position point identifier set to each feature identifier, wherein a position point identifier set includes a plurality of position points associated with corresponding feature information;
    assigning, by the CPU, a state identifier to each feature identifier, a state identifier indicating a use state of corresponding feature information; and
    building, by the CPU, a wake-up feature identifier set and a sleep feature identifier set based on the state identifiers associated with each of the feature identifiers.

8. The method of claim 7 wherein the state identifier set indicates whether the feature information is in wake-up state or in a sleep state.

9. The method of claim 7 further comprising updating, by the CPU, a subset of the pieces of feature information based on the state identifiers associated with the feature identifiers.

10. The method of claim 9 wherein updating a subset of the pieces of feature information based on the state identifiers associated with the feature identifiers comprises:
    waiting, by the CPU, a predetermined period of time upon determining that the sleep feature identifier set is a null set;
    selecting, by the CPU, a feature identifier from the sleep feature identifier set upon determining that the sleep feature identifier set is not null;
    updating, by the CPU, a state identifier associated with the selected feature identifier to a wake-up state;
    updating, by the CPU, the overall feature information with new feature information associated with the selected feature identifier; and
    sending, by the CPU, the updated feature information to the GPU.

11. A system comprising:
a graphics processing unit (GPU); and
a central processing unit (CPU) configured to:
- receive a data frame, the data frame including a plurality of pieces of associated data, the associated data describing a set of points between a start point and an end point;
- identify feature information corresponding to the plurality of pieces of associated data, the feature information representing a property of at least one point in the set of points;
- generate overall feature information by combining at least a portion of the feature information; and
- send the overall feature information to the GPU for visually rendering the overall feature information.

12. The system of claim 11 wherein feature information comprises a position array and a color array, and wherein combining at least a portion of the feature information comprises:
- combining position arrays of respective pieces of feature information to obtain an overall position array;
- combining color arrays of respective pieces of feature information to obtain an overall color array; and
- identifying the overall position array and the overall color array as the overall feature information.

13. The system of claim 11 wherein the pieces of associated data are sequentially ordered and wherein the CPU is further configured to:
- identify adjacent pieces of associated data in the plurality of pieces of associated data based on a start point coordinate of a first piece of associated data and an end point coordinate of a second piece of associated data;
- generate, using a position function, a position array comprising a plurality of position points connecting the first piece of associated data to the second piece of associated data;
- generate a color array comprising a plurality of color values corresponding to each of the plurality of position points in the position array;
- generate connection information based on the position array and the color array; and
- insert the connection information between feature information associated with the first piece of associated data and the feature information associated with the second piece of associated data.

14. The system of claim 11 wherein prior to generating overall feature information by combining at least a portion of the feature information the CPU is further configured to divide the plurality of pieces of associated data into a plurality of sets, wherein at least one set comprises two or more pieces of associated data in the plurality of pieces of associated data.

15. The system of claim 14 wherein generating overall feature information by combining at least a portion of the feature information comprises generating corresponding overall feature information for each of the sets, and wherein sending the overall feature information to the GPU comprises individually sending the corresponding overall feature information corresponding to each set.

16. The system of claim 11 wherein the GPU is further configured to:
- perform a rendering operation based on the overall feature information and obtaining rendering data;
- perform a visualization operation using the rendering data; and
- obtain a visualization result.

17. The system of claim 11 wherein the CPU is further configured to:
- set a feature identifier for each piece of feature information;
- assign a position point identifier set to each feature identifier, wherein a position point identifier set includes a plurality of position points associated with corresponding feature information;
- assign a state identifier to each feature identifier, a state identifier indicating a use state of corresponding feature information; and
- build a wake-up feature identifier set and a sleep feature identifier set based on the state identifiers associated with each of the feature identifiers.

18. The system of claim 17 wherein the state identifier set indicates whether the feature information is in wake-up state or in a sleep state.

19. The system of claim 17 wherein the CPU is further configured to update a subset of the pieces of feature information based on the state identifiers associated with the feature identifiers.

* * * * *